US010678236B2

(12) United States Patent
Jung et al.

(10) Patent No.: US 10,678,236 B2
(45) Date of Patent: Jun. 9, 2020

(54) CLEANING ROBOT

(71) Applicant: Samsung Electronics Co, Ltd., Suwon-si, Gyeonggi-do (KR)

(72) Inventors: Jae Young Jung, Suwon-si (KR); Shin Kim, Hwaseong-si (KR); Sang Sik Yoon, Gimpo-si (KR); Byung Chan Kim, Yongin-si (KR); Byoung In Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/031,978

(22) PCT Filed: Oct. 23, 2014

(86) PCT No.: PCT/KR2014/010031
§ 371 (c)(1),
(2) Date: May 12, 2016

(87) PCT Pub. No.: WO2015/060672
PCT Pub. Date: Apr. 30, 2015

(65) Prior Publication Data
US 2016/0274580 A1 Sep. 22, 2016

(30) Foreign Application Priority Data

Oct. 25, 2013 (KR) .................. 10-2013-0127940
Oct. 25, 2013 (KR) .................. 10-2013-0127956

(51) Int. Cl.
*G05D 1/00* (2006.01)
*G05D 1/02* (2020.01)
(Continued)

(52) U.S. Cl.
CPC ............ *G05D 1/0022* (2013.01); *A47L 11/24* (2013.01); *A47L 11/4011* (2013.01);
(Continued)

(58) Field of Classification Search
CPC .. G05D 1/0022; G05D 1/0016; G05D 1/0033; G05D 1/0038; G05D 1/0044;
(Continued)

(56) References Cited

U.S. PATENT DOCUMENTS 5,307,273 A * 4/1994 Oh ................. A47L 11/4011
180/167
8,593,329 B2 * 11/2013 Mohamadi ............ G01S 13/888
342/22
(Continued)

FOREIGN PATENT DOCUMENTS

KR     2002-0081511    10/2002
KR     10-2008-0041891   5/2008
(Continued)

OTHER PUBLICATIONS

Written Opinion of the International Searching Authority dated Feb. 2, 2015 from International Patent Application No. PCT/KR2014/010031, 25 pages.
(Continued)

*Primary Examiner* — Thomas G Black
*Assistant Examiner* — Ce Li Li
(74) *Attorney, Agent, or Firm* — Staas & Halsey LLP

(57) ABSTRACT

Provided is a cleaning robot including a main body; a driving unit configured to move the main body; a communication unit configured to establish wireless communication with a user terminal to which a manipulation command is input; and a controller configured to transmit a position detecting signal to the user terminal, and detect a position of the user terminal based on a time difference between the position detecting signal and a response signal transmitted from the user terminal.

15 Claims, 30 Drawing Sheets

(51) Int. Cl.
*A47L 11/24* (2006.01)
*A47L 11/40* (2006.01)

(52) U.S. Cl.
CPC ........ *A47L 11/4013* (2013.01); *G05D 1/0016* (2013.01); *G05D 1/0033* (2013.01); *G05D 1/0257* (2013.01); *A47L 2201/04* (2013.01); *A47L 2201/06* (2013.01); *G05D 2201/0203* (2013.01)

(58) Field of Classification Search
CPC .... G05D 1/024; G05D 1/0251; G05D 1/0255; G05D 1/0257; G05D 1/0272; G05D 1/0274; G05D 2201/0203; G01S 7/41; G01S 13/0209; G01S 13/06; G01S 13/888; G01S 13/56; G01S 13/878; G01S 13/426; A47L 11/24; A47L 11/4011; A47L 11/4013; A47L 2201/04; A47L 2201/06

See application file for complete search history.

(56) References Cited

U.S. PATENT DOCUMENTS

| | | | | |
|---|---|---|---|---|
| 9,037,296 B2* | 5/2015 | Choe | ...................... | G06N 3/008 700/250 |
| 2004/0199292 A1* | 10/2004 | Sakagami | ............ | G05D 1/0251 700/259 |
| 2005/0200325 A1* | 9/2005 | Kim | ...................... | G08C 23/04 318/568.12 |
| 2005/0222713 A1* | 10/2005 | Kawabe | ................. | B25J 19/027 700/259 |
| 2006/0061504 A1* | 3/2006 | Leach, Jr. | ................. | G01S 7/41 342/22 |
| 2006/0217838 A1* | 9/2006 | Sugino | ................. | G05D 1/0251 700/245 |
| 2007/0150106 A1* | 6/2007 | Hashimoto | ............ | G06N 3/004 700/245 |
| 2008/0027591 A1* | 1/2008 | Lenser | ................. | G05D 1/0274 701/2 |
| 2008/0079383 A1* | 4/2008 | Nakamoto | ................. | B25J 5/00 318/587 |
| 2008/0218403 A1* | 9/2008 | Lee | ........................ | G01S 5/0215 342/118 |
| 2010/0066587 A1* | 3/2010 | Yamauchi | ............ | G05D 1/0044 342/70 |
| 2011/0141909 A1* | 6/2011 | Hibara | .................. | G01S 5/0036 370/241 |
| 2011/0245974 A1* | 10/2011 | Kawamoto | ............ | B25J 9/1664 700/259 |
| 2013/0060379 A1* | 3/2013 | Choe | ..................... | G06N 3/008 700/245 |

FOREIGN PATENT DOCUMENTS

| | | | |
|---|---|---|---|
| KR | 10-2009-0076721 | | 7/2009 |
| KR | 20090076721 A | * | 7/2009 |
| KR | 10-2011-0119118 | | 11/2011 |
| WO | PCT/KR2014/010031 | | 10/2014 |

OTHER PUBLICATIONS

International Search Report dated Feb. 2, 2015 from International Patent Application No. PCT/KR2014/010031, 5 pages.
International Preliminary Report dated Apr. 26, 2016 from International Patent Application No. PCT/KR2014/010031, 27 pages.

* cited by examiner (a)

(b)

(a)

(b)

(a)

(b)

(a)

(b)

(c)

(a)

(b)

CLEANING ROBOT

CROSS-REFERENCE TO RELATED APPLICATIONS

This application is a U.S. national stage application of International Application No. PCT/KR2014/010031 filed on Oct. 23, 2014 and claims the priority benefit of Korean Application Nos. 10-2013-0127940 and 10-2013-0127956 each filed on Oct. 25, 2013, in the Korean Intellectual Property Office, the disclosures of all of which are incorporated by reference in their entirety.

BACKGROUND

1. Field

The present invention relates to a cleaning robot, and more particularly, to a cleaning robot capable of detecting the positions of a user and an obstacle.

2. Description of the Related Art

A cleaning robot is a device that automatically cleans a space to be cleaned by sucking foreign substances, such as dust, from a floor of the space while driving through the space without a user's manipulation. That is, the cleaning robot cleans a space to be cleaned while driving through the space.

In the case of a cleaning robot according to the related art, when a user wants to first clean a specific location in a space to be cleaned, the user should check the position of the cleaning robot and move the cleaning robot to the specific location using a remote control.

However, when the user does not know the position of the cleaning robot, the user should find the cleaning robot. While the cleaning robot cleans a space under a sofa, a bed, etc., the user would have difficulties in finding the cleaning robot. Also, the user may have difficulties in controlling driving of the cleaning robot using a remote control to move the cleaning robot to a specific location.

Also, while the cleaning robot cleans a space to be cleaned while driving through the space, movement of the cleaning robot may be interrupted with an obstacle (such as furniture, a door sill, wire, etc.) located in a driving path of the cleaning robot. Thus, the cleaning robot should perform avoidance driving to sense and avoid the obstacle.

In order to sense and avoid an obstacle, a cleaning robot according to the related art emits infrared light, ultrasonic waves, etc. in a forward direction and detects the presence and position of the obstacle using reflected light or waves.

However, when infrared light or ultrasonic waves are used, the precision of detecting the presence and position of an obstacle may be low due to the color of a space to be cleaned, light such as sunlight, external noise, temperature, etc.

SUMMARY

Additional aspects and/or advantages will be set forth in part in the description which follows and, in part, will be apparent from the description, or may be learned by practice of the disclosure.

One aspect of the present invention is directed to a cleaning robot capable of detecting the position of a user using an ultra-wide band communication method.

Another aspect of the present invention is directed to a cleaning robot capable of detecting the presence and position of an obstacle without being interfered by external influences.

One aspect of the present invention provides a cleaning robot including a main body; a driving unit configured to move the main body; a communication unit configured to establish wireless communication with a user terminal to which a manipulation command is input; and a controller configured to transmit a position detecting signal to the user terminal, and detect a position of the user terminal based on a time difference between the position detecting signal and a response signal transmitted from the user terminal.

In one exemplary embodiment, the communication unit may include at least two ultra-wide band communication modules configured to transmit an impulse signal.

In one exemplary embodiment, in order to transmit the position detecting signal to the user terminal, the controller may control the communication unit to cause each of the at least two ultra-wide band communication modules to transmit the impulse signal to the user terminal.

In one exemplary embodiment, the controller may detect a distance between each of the at least two ultra-wide band communication modules and the user terminal, based on a difference between time when each of the at least two ultra-wide band communication modules transmits the impulse signal and time when each of the at least two ultra-wide band communication modules receives the response signal.

In one exemplary embodiment, the controller may detect coordinates of the user terminal using the distance between each of the at least two ultra-wide band communication modules and the user terminal and using triangulation.

In one exemplary embodiment, when a 'follow' command is input via the user terminal, the controller may control the driving unit such that the distances between the at least two ultra-wide band communication modules and the user terminal are less than or equal to a predetermined reference distance.

In one exemplary embodiment, when a 'follow' command is input via the user terminal, the controller may control the driving unit such that the coordinates of the user terminal are in a predetermined range of coordinates.

In one exemplary embodiment, when a manual cleaning command is input via the user terminal, the controller may control the driving unit to move the main body along a moving trajectory of the user terminal.

In one exemplary embodiment, in order to detect the moving trajectory of the user terminal, the controller may calculate a moving direction and displacement of the user terminal, based on a change in the coordinates of the user terminal.

In one exemplary embodiment, the controller may control the driving unit to move the main body by the moving displacement in the moving direction.

In one exemplary embodiment, the communication unit may establish wireless communication with a beacon located at a reference position, and the controller may transmit the position detecting signal to the beacon, and detect a position of the main body relative to the reference position, based on a time difference between the position detecting signal and a response signal transmitted from the beacon.

In one exemplary embodiment, the controller may detect a position of the beacon relative to the main body based on the time difference, and calculate the position of the main body based on the position of the beacon.

In one exemplary embodiment, when a designated-position cleaning command is input, the controller may detect a position indicted by the user terminal, based on location information and posture information of the user terminal.

In one exemplary embodiment, the communication unit may output a sensing radio wave and receive a radio wave reflected from a user's body, and the controller may detect a position of the user's body based on a time difference between the sensing radio wave and the reflected radio wave, and control the driving unit when a follow-user command is input, such that a distance between the user and the main body is less than or equal to a predetermined reference distance.

Another aspect of the present invention provides a cleaning robot including a main body; a driving unit configured to move the main body; a front-obstacle sensing unit configured to transmit a front-sensing radio wave toward a front of the main body and detect a front-reflected radio wave reflected from a front obstacle; and a controller configured to detect location information of the front obstacle based on the front-reflected radio wave. The front-obstacle sensing unit includes at least two ultra-wide band radar sensors configured to transmit an impulse radio wave.

In one exemplary embodiment, the controller may detect a position of the front obstacle based on a time difference between the front-sensing radio wave and the front-reflected radio wave.

In one exemplary embodiment, the controller may detect the location information of the front obstacle, based on a distance between the at least two ultra-wide band radar sensors and distances between the at least two ultra-wide band radar sensors and the front obstacle.

In one exemplary embodiment, the cleaning robot may further include a floor-obstacle sensing module configured to emit a floor-sensing radio wave toward a floor of a space to be cleaned, and detect a floor-reflected radio wave reflected from a floor obstacle, and the floor-obstacle sensing module may include at least one ultra-wide band radar sensor configured to transmit an impulse radio wave.

In one exemplary embodiment, the controller may detect a position of the floor obstacle based on the floor-reflected radio wave.

In one exemplary embodiment, the controller may detect a location of the floor obstacle, based on a time difference between the floor-sensing radio wave and the floor-reflected radio wave.

In one exemplary embodiment, the controller may determine quality of a material of the floor of the space to be cleaned, based on a waveform of the floor-reflected radio wave.

A cleaning robot according to one aspect of the present invention is capable of detecting a user's position by detecting the position of a user terminal using an ultra-wide band communication method and triangulation.

A cleaning robot according to another aspect of the present invention is capable of detecting the presence and position of an obstacle using impulse waves which are robust to external influences. Thus, an obstacle-sensing capability of the cleaning robot is hardly changed by a change in an external environment.

DETAILED DESCRIPTION

Figure 1:
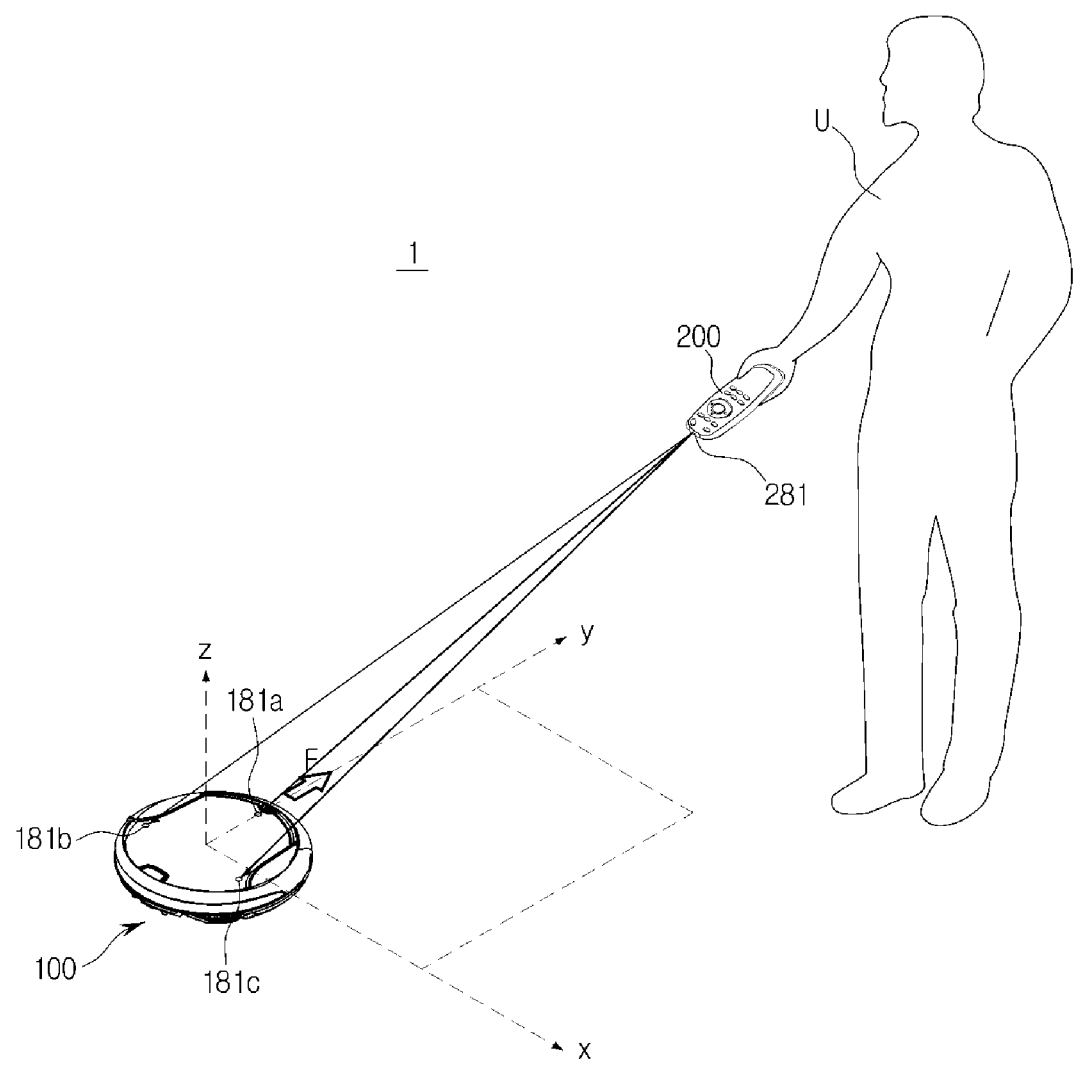
FIGS. 1 and 2 are drawings schematically illustrating an automatic cleaning system according to an exemplary embodiment.

Reference will now be made in detail to embodiments, examples of which are illustrated in the accompanying drawings, wherein like reference numerals refer to like elements throughout. The embodiments are described below to explain the disclosure by referring to the figures. The exemplary embodiments described in the present specification and illustrated in the drawings are merely examples of the invention disclosed herein. It should be understood that various modified examples that replace the exemplary embodiments and drawings set forth herein would have been made at the filing date of the present application.

Hereinafter, automatic cleaning systems according to various exemplary embodiments will be described in detail with reference to the accompanying drawings.

Figure 2:
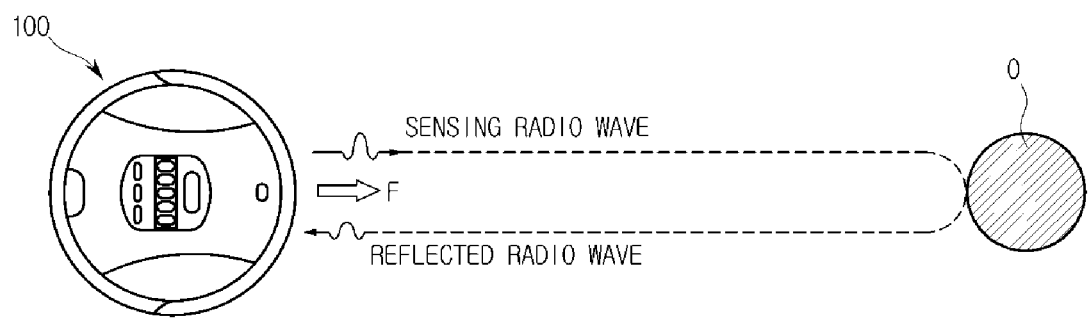

FIGS. 1 and 2 are drawings schematically illustrating an automatic cleaning system according to an exemplary embodiment.

As illustrated in FIG. 1, an automatic cleaning system 1 includes a cleaning robot 100 that cleans a space to be cleaned while driving through the space, and a user terminal 200 that receives a manipulation command from a user and transmits the manipulation command to the cleaning robot 100 through wireless communication. Here, the user terminal 200 may employ either an exclusive remote control manufactured to manipulate the cleaning robot 100 or a portable terminal configured to establish voice communication and data communication with various home appliances through wireless communication.

The cleaning robot 100 may use ultra-wide band (UWB) radio waves to detect a position of the user terminal 200.

In detail, the cleaning robot 100 includes robot UWB communication modules 181a, 181b, and 181c using UWB radio waves. Similarly, the user terminal 200 includes a terminal UWB communication module 281 using UWB radio waves. The robot UWB communication modules 181a, 181b, and 181c included in the cleaning robot 100 and the terminal UWB communication module 281 included in the user terminal 200 may communicate with one another.

Here, the cleaning robot 100 may detect the position of the user terminal 200, based on time differences between UWB radio-wave signals transmitted from the robot UWB communication modules 181a, 181b, and 181c and a UWB radio-wave signal transmitted from the terminal UWB communication module 281. Also, the cleaning robot 100 may detect a user's position based on the position of the user terminal 200.

Also, the cleaning robot 100 may use a UWB to sense an obstacle that interrupts driving of the cleaning robot 100.

In detail, as illustrated in FIG. 2, the cleaning robot 1 transmits a UWB sensing radio wave toward a front direction or a floor of a space to be cleaned, and detects the presence and position of an obstacle O based on a UWB radio wave reflected and returned from the obstacle O.

UWB radio waves will now be described before the structures of the cleaning robot 100 and the user terminal 200 according to an exemplary embodiment are described in detail.

Figure 3:
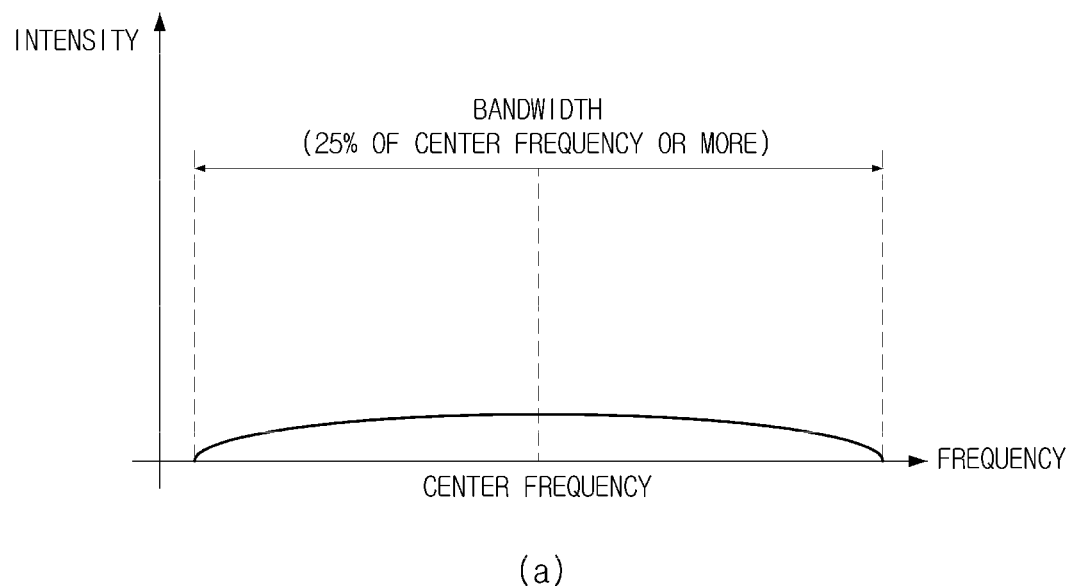
FIG. 3 is a graph showing impulse signals output from a cleaning robot and a user terminal and frequency spectrums of the impulse signals, according to an exemplary embodiment.
Figure 3:
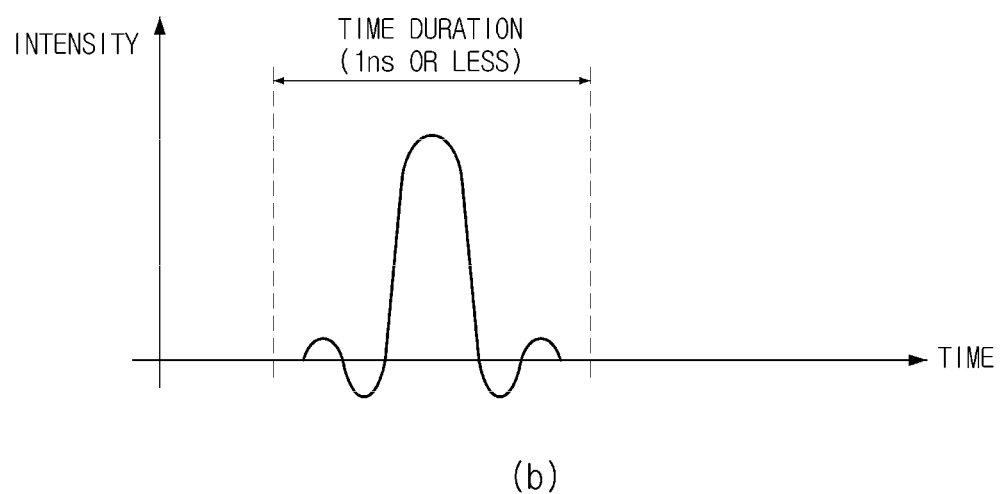
Figure 4:
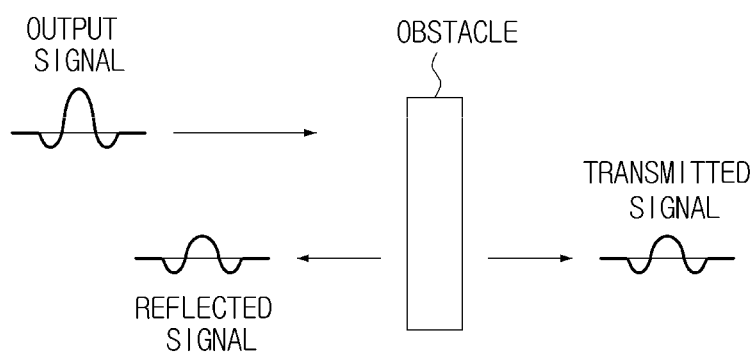
FIG. 4 is a graph showing an impulse signal output from a cleaning robot and a reflection signal reflected from an obstacle, according to an exemplary embodiment.
Figure 4:
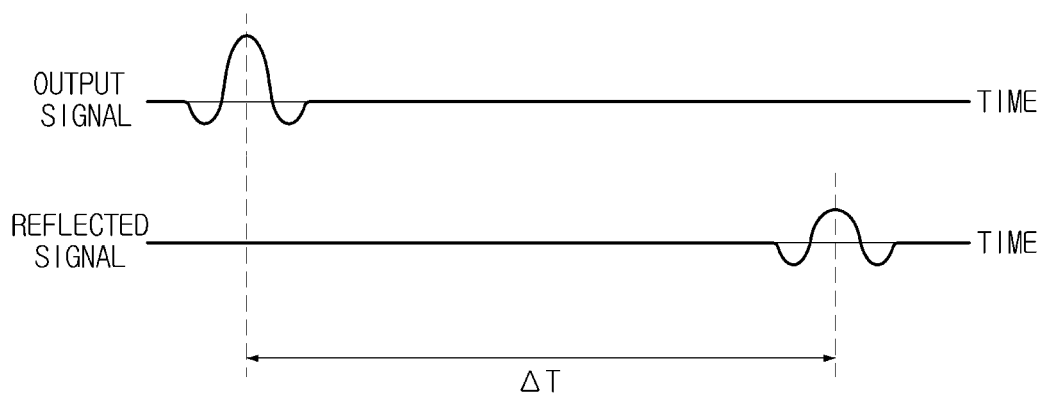

FIG. 3 is a graph showing impulse signals output from a cleaning robot and a user terminal and frequency spectrums of the impulse signals, according to an exemplary embodiment. FIG. 4 is a graph showing an impulse signal output from a cleaning robot and a signal reflected from an obstacle, according to an exemplary embodiment.

A UWB communication method is a communication method using a bandwidth that is 25% or more of a center frequency as illustrated in FIG. 3(a). For example, a communication method using a bandwidth of 2.5 GHz or more when a center frequency is 10 GHz may be a UWB communication method. In the UWB communication method, impulse signals having a short time duration of 1 ns (nano-second) or less as illustrated in FIG. 3(b) are used and carrier waves are not used.

In the UWB communication method, communication may be established by transmitting a signal by dispersing the energy of the signal to a UWB without interfering with other communication systems, and established with a small amount of power.

The UWB communication method is applicable to not only the field of communication but also the field of radar. In particular, in the field of radar, the UWB communication method is applicable to a precision geo-location system capable of precisely performing position tracing in narrow spaces, e.g., indoor spaces, without a global positioning system (GPS) or the like.

In detail, as illustrated in FIG. 4(a), when an impulse signal output from a UWB communication module meets an obstacle, a portion of the output impulse signal is reflected from the obstacle and the remaining portion thereof penetrates the obstacle. In an impulse signal used in the UWB communication method, a property capable of penetrating an obstacle is available to the field of communication and a property capable of being reflected from an obstacle is applicable to the field of radar.

In particular, as illustrated in FIG. 4(b), in the field of radar, a distance to an obstacle may be measured using a time difference ΔT between an impulse signal output from a UWB communication module and a signal reflected from the obstacle. In detail, the distance to the obstacle may be calculated by multiplying a time difference between time when the impulse signal is output and time when the reflected signal is input by the speed of radio waves and dividing the result of multiplying the time difference by the speed of radio waves by '2'.

The structures of the cleaning robot 100 and the user terminal 200 will be described in detail below.

Figure 5:
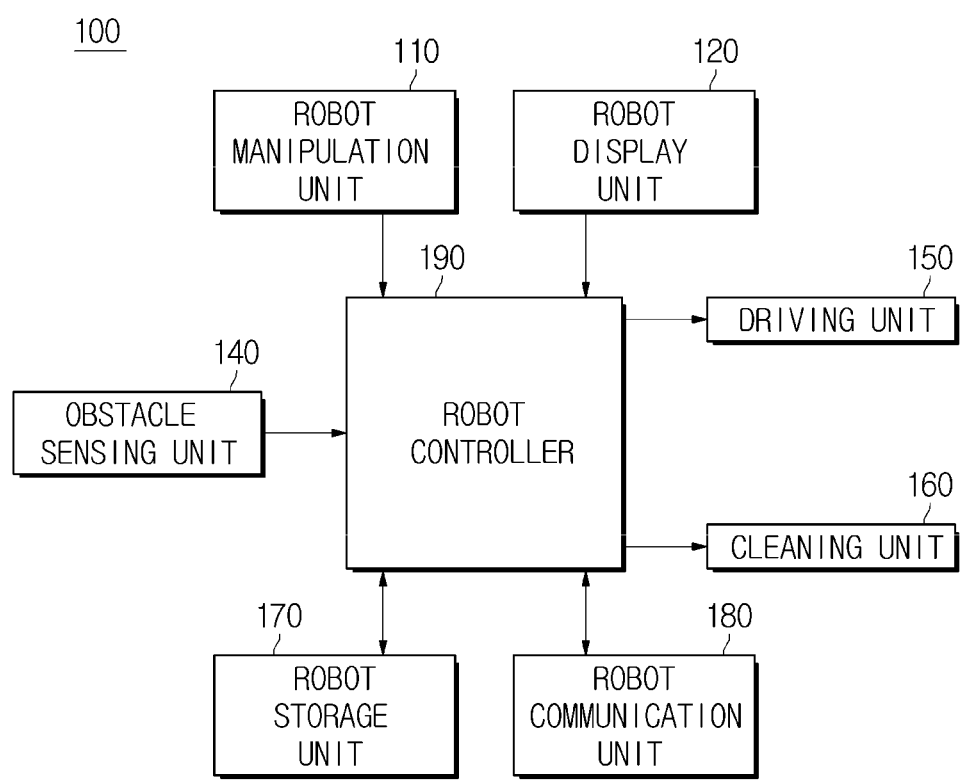
FIG. 5 is a block diagram illustrating the flow of controlling a cleaning robot according to an exemplary embodiment.
Figure 6:
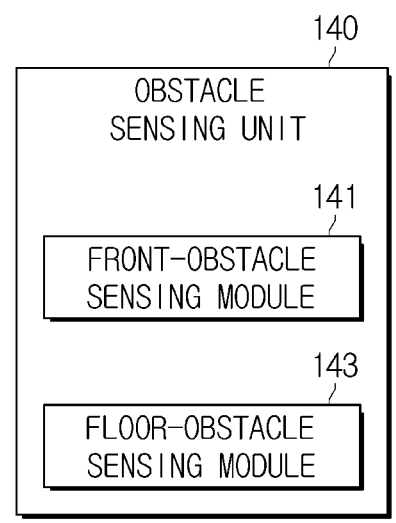
FIG. 6 is a block diagram of an obstacle sensing unit included in a cleaning robot according to an exemplary embodiment.
Figure 7:
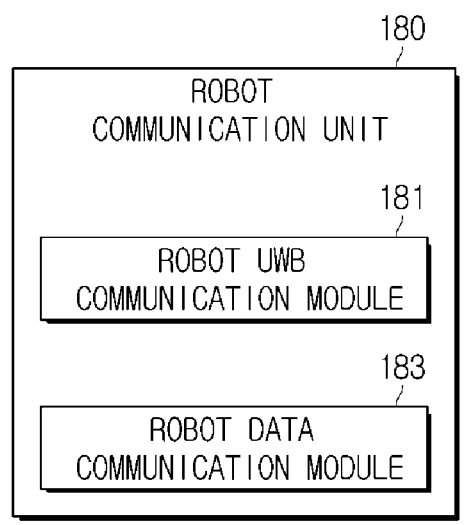
FIG. 7 is a block diagram of a robot communication unit included in a cleaning robot according to an exemplary embodiment.
Figure 8:
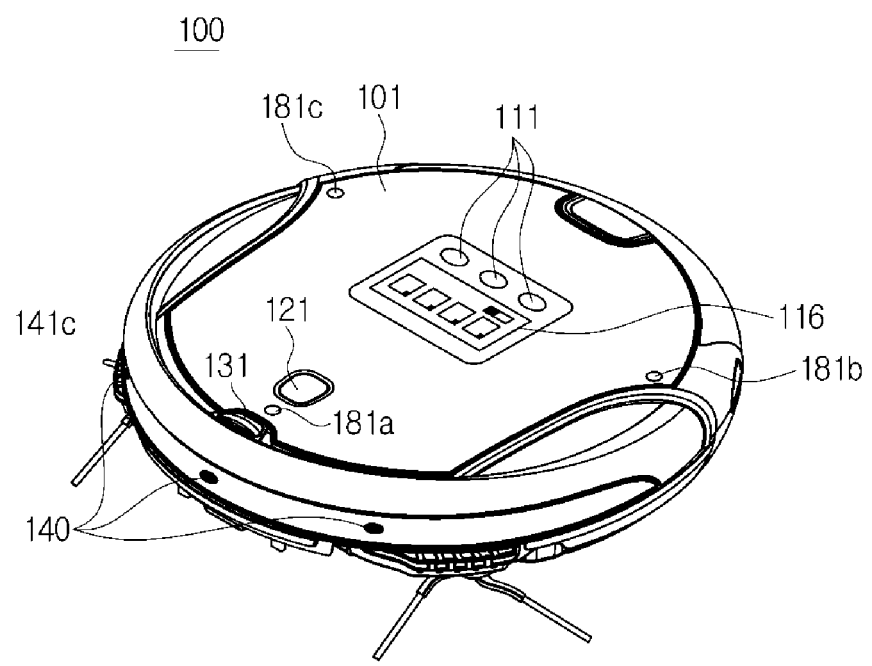
FIG. 8 is a perspective view illustrating the exterior of a cleaning robot according to an exemplary embodiment.
Figure 9:
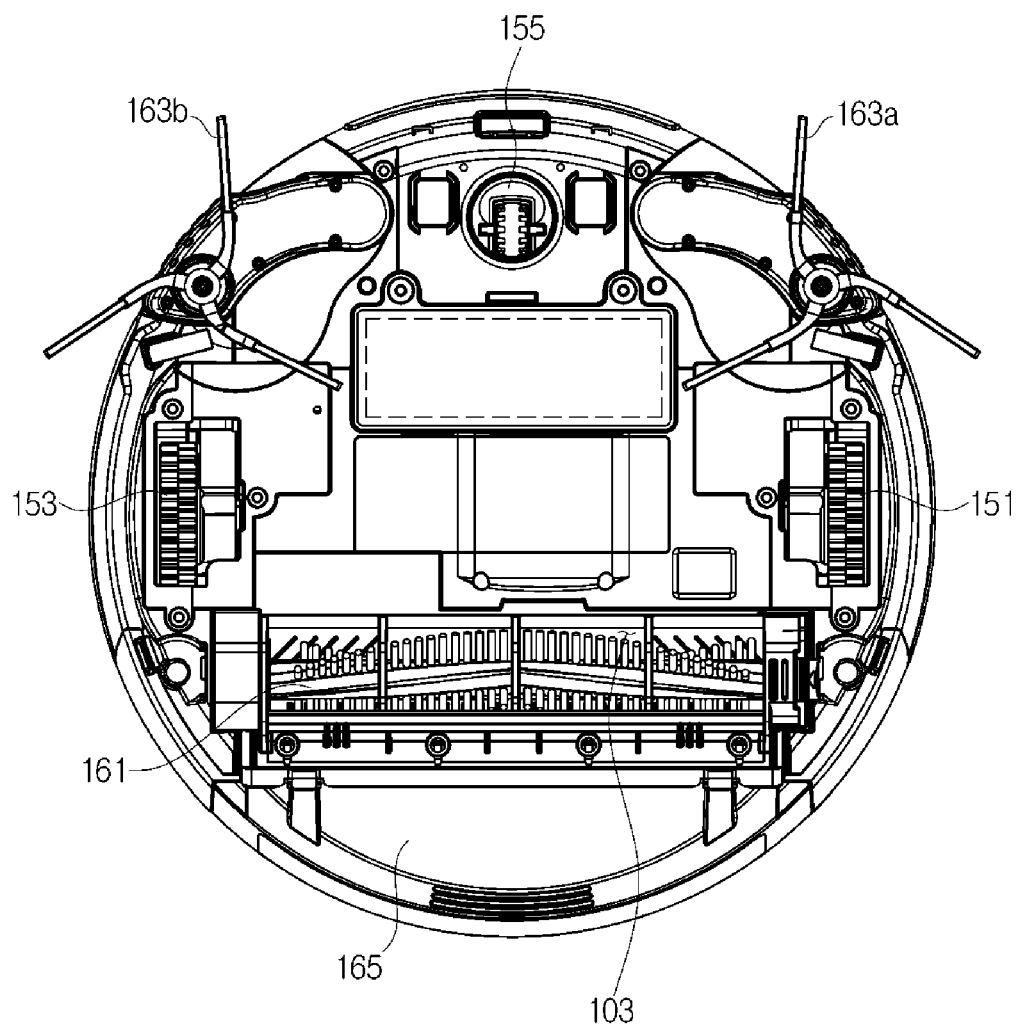
FIG. 9 is a bottom view illustrating a bottom surface of a cleaning robot according to an exemplary embodiment.

FIG. 5 is a block diagram illustrating the flow of controlling a cleaning robot according to an exemplary embodiment. FIG. 6 is a block diagram of an obstacle sensing unit included in a cleaning robot according to an exemplary embodiment. FIG. 7 is a block diagram of a robot communication unit included in a cleaning robot according to an exemplary embodiment. FIG. 8 is a perspective view illustrating the exterior of a cleaning robot according to an exemplary embodiment. FIG. 9 is a bottom view illustrating a bottom surface of a cleaning robot according to an exemplary embodiment.

Referring to FIGS. 5 to 9, a cleaning robot 100 includes a main body 101 forming the exterior of the cleaning robot 100. The main body 101 includes a robot manipulation unit 110 configured to receive a manipulation command regarding the cleaning robot 100 from a user, a robot display unit 120 that displays operational information of the cleaning robot 100 to the user, an obstacle sensing unit 140 that senses an obstacle, a driving unit 150 that moves the cleaning robot 100, a cleaning unit 160 that cleans a space to be cleaned, a robot storage unit 170 that stores a program and data for controlling an operation of the cleaning robot 100, a robot communication unit 180 that communicates with the user terminal 200, etc., and a robot controller 190 that controls an operation of the cleaning robot 100.

The robot manipulation unit 110 is provided on a top surface of the main body 101, and includes a plurality of manipulation buttons 111 via which a manipulation command regarding the cleaning robot 100 is received from a user. The plurality of manipulation buttons 111 may include a power button for controlling the cleaning robot 100 to be on/off; a cleaning-mode selection button for selecting a cleaning mode, e.g., an automatic cleaning mode, a manual cleaning mode, etc. of the cleaning robot 100; an 'operate/stop' command button for instructing the cleaning robot 100 to be operated or stopped; a 'charge/return' command button for instructing the cleaning robot 100 to be returned to a charging station (not shown), etc. The plurality of manipulation buttons 111 may employ a micro-switch or a membrane switch for detecting pressure applied by a user, a touch pad for detecting a user's touch, etc.

The robot display unit 120 is provided on the top surface of the main body 101, and includes a display panel 121 configured to display operational information of the cleaning robot 100 to a user. The display panel 121 may display the operational information of the cleaning robot 100, e.g., current time, the state of a battery, a cleaning mode, etc. The display panel 121 may employ a liquid crystal display (LCD) panel or a light-emitting diode (LED) panel.

The obstacle sensing unit 140 may include a front-obstacle sensing module 141 which senses an obstacle in front of the main body 101, and a floor-obstacle sensing module 143 which senses an obstacle at a floor of a space to be cleaned.

The front-obstacle sensing module 141 and the floor-obstacle sensing module 143 will be described in detail below.

The driving unit 150 includes a pair of driving wheels 151 and 153 for moving the cleaning robot 100, and a roller 155 for assisting movement of the cleaning robot 100.

The pair of driving wheels 151 and 153 are provided on left and right edges of a bottom surface of the main body 101, and configured to cause the cleaning robot 100 to be moved forward or backward or to be rotated. For example, the cleaning robot 100 is moved forward when both of the pair of driving wheels 151 and 153 are rotated in a forward direction and is moved backward when both of the pair of driving wheels 151 and 153 are rotated in a backward direction. When the pair of driving wheels 151 and 153 are rotated at different speeds in the same direction, a moving direction of the cleaning robot 100 may be changed to a right or left direction.

For example, if both of the left driving wheel 151 and the right driving wheel 153 are rotated in the forward direction, the moving direction of the cleaning robot 100 may be changed to the left direction when the rotation speed of the right driving wheel 153 is faster than that of the left driving wheel 151, and may be changed to the right direction when the rotation speed of the left driving wheel 151 is faster than that of the right driving wheel 153. When the pair of driving wheels 151 and 153 are rotated in different directions, the cleaning robot 100 may be rotated at the same spot in the left or right direction.

The roller 155 is installed in the front of the bottom surface of the main body 101, and rotated according to the moving direction of the cleaning robot 100. The roller 155 enables the cleaning robot 100 to maintain a stable posture.

The cleaning unit 160 includes a main brush 161 that scatters dust in a space to be cleaned, a pair of side brushes 163a and 163b that guide the dust in the space to be cleaned to be moved toward the main brush 161, and a dust box 165 that sucks and stores the dust scattered by the main brush 161.

The main brush 161 is provided in a dust sucking hole 103 formed in the bottom surface of the main body 101, and configured to scatter dust in a space to be cleaned into the dust sucking hole 103 while rotating about a rotation shaft in a direction perpendicular to the moving direction of the main body 101.

The pair of side brushes 163a and 163b are installed on left and right edges of the bottom surface of the main body 101. That is, the pair of side brushes 163a and 163b are installed in front of the pair of driving wheels 151 and 153. The pair of side brushes 163a and 163b sweep dust in a space to be cleaned, which cannot be cleaned by the main brush 161, and guide the dust to be moved toward the main brush 161 while rotating about a rotation shaft in a direction perpendicular to the bottom surface of the main body 101. The pair of side brushes 163a and 163b may be configured to not only be rotated at the same spot but also protrude to the outside of the cleaning robot 100, thereby expanding a space to be cleaned by the cleaning robot 100.

The robot storage unit 170 may include not only a nonvolatile memory (not shown), such as a magnetic disc, a semiconductor disk (e.g., a solid state disk), etc., designed to permanently store a control program and control data for controlling an operation of the cleaning robot 100, but also a volatile memory (not shown), such as a DRAM, an SRAM, etc., designed to temporarily store temporary data generated during controlling of the operation of the cleaning robot 100.

The robot communication unit 180 may include a robot UWB communication module 181 that communicates with the user terminal 200 using a UWB wireless communication method, and a robot data communication module 183 that establishes data communication with the user terminal 200 or a charging station (not shown) using another wireless communication method, e.g., wireless fidelity (W-Fi), Bluetooth, Zigbee, near-field communication (NFC), infrared communication, etc.

The robot UWB communication module 181 includes a first robot UWB communication module 181a provided in the front of the top surface of the main body 101, a second robot UWB communication module 181b provided on a left side of the top surface of the main body 101, and a third robot UWB communication module 181c provided on a right side of the top surface of the main body 101. The cleaning robot 100 may communicate with the user terminal 200 and detect the position of the user terminal 200 via the robot UWB communication module 181.

The robot controller 190 controls the driving unit 150 and the cleaning unit 160 to clean a space to be cleaned while the main body 101 is driving through the space, according to a manipulation command received from a user via the user terminal 200, the robot manipulation unit 110, or a voice input unit 130. In particular, the robot controller 190 controls the robot communication unit 180 to cause the robot UWB communication module 181 to communicate with the user terminal 200, and calculates the position of the user terminal 200 based on a time difference between a transmitted signal and a received signal using the robot UWB communication module 181.

However, exemplary embodiments of the present invention are not limited to calculating the position of the user terminal 200 based on the time difference between the transmitted signal and the received signal, performed by the robot controller 190. For example, the position of the user terminal 200 may be calculated by the user terminal 200 which will be described below, based on the time difference between the transmitted signal and the received signal.

The obstacle sensing unit 140 of the cleaning robot 100 will now be described below.

Figure 10:
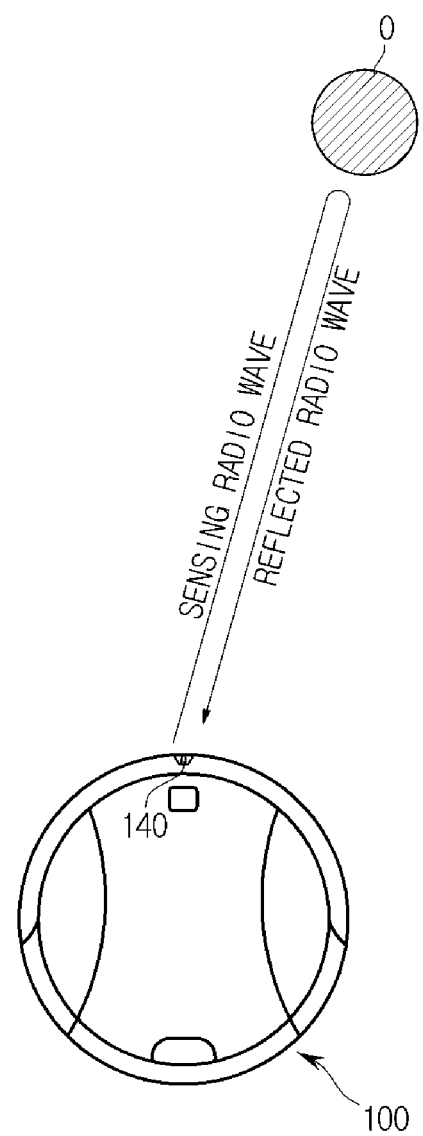
FIG. 10 is a diagram illustrating detecting a distance to an obstacle using an obstacle sensing unit included in a cleaning robot according to an exemplary embodiment.
Figure 11:
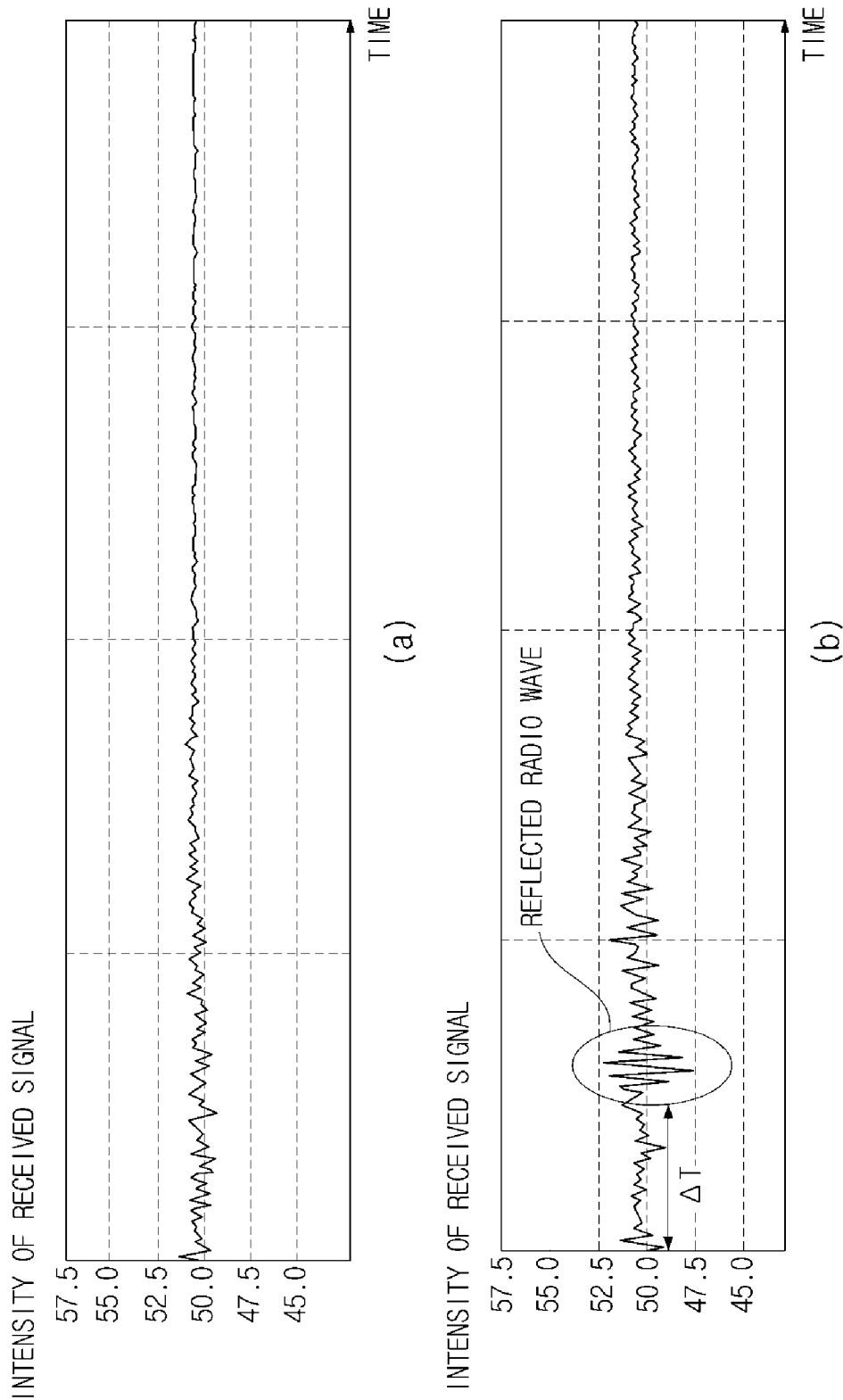
FIG. 11 illustrates an example of a reflected signal detected using an obstacle sensing unit included in a cleaning robot according to an exemplary embodiment.

FIG. 10 is a diagram illustrating detecting a distance to an obstacle using an obstacle sensing unit included in a cleaning robot according to an exemplary embodiment. FIG. 11 illustrates an example of a reflected signal detected by an obstacle sensing unit included in a cleaning robot according to an exemplary embodiment.

As illustrated in FIG. 10, the obstacle sensing unit 140 included in the cleaning robot 100 outputs sensing radio waves. The sensing radio waves may be UWB radio waves.

Some of the sensing radio waves output from the obstacle sensing unit 140 may penetrate an obstacle O, and the remaining sensing radio waves may be reflected from the obstacle O and returned to the obstacle sensing unit 140.

The obstacle sensing unit 140 may receive the radio waves reflected from the obstacle O and analyze the reflected radio waves to calculate the distance to the obstacle O.

For example, when the obstacle O is not present, the obstacle sensing unit 140 may receive an interference signal occurring near the cleaning robot 100. Thus, the obstacle sensing unit 140 may continuously receive signals having a comparatively regular intensity as illustrated in FIG. 11(*a*).

When the obstacle O is present, the obstacle sensing unit 140 may receive reflected radio waves in the form of a pulse having high amplitude as illustrated in FIG. 11(*b*). In this case, when the intensity of the reflected radio waves received by the obstacle sensing unit 140 are equal to or greater than a reference value, a maximum value of a received signal may be detected and a time during which the maximum value is detected may be determined as a reflected-signal sensing time ΔT.

As described above, when the obstacle O is present, the amplitude, phase, frequency, etc. of the reflected radio waves received by the obstacle sensing unit 140 may change. In other words, the obstacle sensing unit 140 may sense a change in the phase or frequency of sensing radio waves after the obstacle sensing unit 140 transmits the sensing radio waves. In this case, the obstacle sensing unit 140 may determine a time during which the change in the phase or frequency of the sensing radio waves occurs as the reflected-signal sensing time ΔT.

When the reflected-signal sensing time ΔT is calculated, the robot controller 190 of the cleaning robot 100 may calculate the distance between the obstacle sensing unit 140 and the obstacle O, based on the reflected-signal sensing time ΔT. In detail, the robot controller 190 may calculate the distance from the obstacle sensing unit 140 to the obstacle O by dividing the product of the reflected-signal sensing time ΔT and the speed of radio waves (e.g., 300,000 Km/s) by '2'.

The obstacle sensing unit 140 included in the cleaning robot 1 according to an exemplary embodiment calculates the distance between the obstacle sensing unit 140 and the obstacle O using a time-of-fight (TOF), i.e., a time difference between a sensing radio wave and a reflected radio wave, but exemplary embodiments of the present invention are not limited thereto.

For example, the obstacle sensing unit 140 may calculate the distance between the obstacle sensing unit 140 and the obstacle O, based on the amount of the energy of the reflected radio wave. That is, the obstacle sensing unit 140 may detect the amount of the energy of a reflected signal based on a decrease in the amount of the energy of the reflected radio wave according to the distance, and calculate a distance corresponding to the detected amount of the energy.

As described above, the obstacle sensing unit 140 configured to calculate the distance to the obstacle O using the time difference between the sensing radio wave and the reflected radio wave may include the front-obstacle sensing module 141 that senses an obstacle O located in front of the cleaning robot 100, and the floor-obstacle sensing module 143 that senses an obstacle O located at a floor of a space to be cleaned.

The front-obstacle sensing module 141 and the floor-obstacle sensing module 143 will now be described below.

The front-obstacle sensing module 141 may sense a front obstacle that is located in the front of the cleaning robot 100 and interrupts movement of the cleaning robot 100. Here, the front obstacle O that may be sensed by the front-obstacle sensing module 141 may be furniture, a wall, etc. which is located at location higher than the height of the main body 101.

Figure 12:
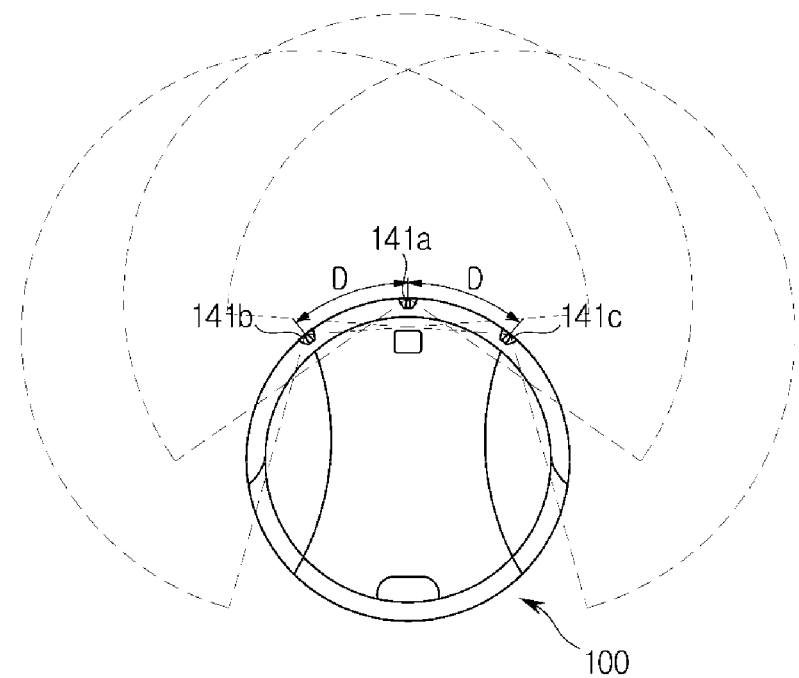
FIG. 12 illustrates a range of sensing waves emitted from a front-obstacle sensing module included in a cleaning robot according to an exemplary embodiment.
Figure 12:
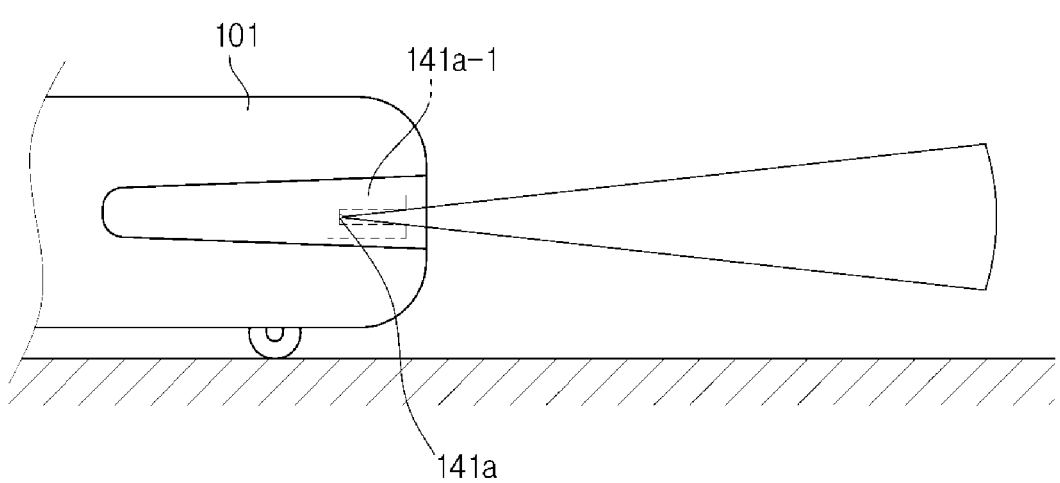

FIG. 12 illustrates a range of sensing waves emitted from a front-obstacle sensing module included in a cleaning robot according to an exemplary embodiment. In detail, FIG. 12(*a*) illustrates a sensing range A in a direction parallel to a floor of a space to be cleaned, and FIG. 12(*b*) illustrates a sensing range B in a direction perpendicular to the floor of the space to be cleaned.

The front-obstacle sensing module 141 may include at least two front radar sensors to detect the position of a front obstacle O. For example, the front-obstacle sensing module 141 may include three front radar sensors 141*a*, 141*b*, and 141*c* as illustrated in FIG. 10. The three front radar sensors 141*a*, 141*b*, and 141*c* may be arranged in the front of the main body 101 at predetermined intervals D.

Each of the front radar sensors 141*a*, 141*b*, and 141*c* may transmit a sensing radio wave in the front direction and receive a radio wave reflected from the front obstacle O.

Also, as illustrated in FIG. 12(*a*), each of the front radar sensors 141*a*, 141*b*, and 141*c* may output a sensing radio wave which is widely spread in the direction parallel to the floor of the space to be cleaned. In this case, a range of emitting the sensing radio wave may be a range of about 180 to 220 degrees.

Also, regions to which the three front radar sensors 141*a*, 141*b*, and 141*c* transmit sensing signals overlap each other to form a sensing region A. The sensing region A is a region in which the front-obstacle sensing module 141 may detect location information of the front obstacle O.

As illustrated in FIG. 12(*b*), a sensing radio wave output from each of the front radar sensors 141*a*, 141*b*, and 141*c* is narrow in the direction perpendicular to the floor of the space to be cleaned. For example, diffusion of the sensing radio wave in upward and downward directions is limited by a shade 141a-1 installed on the first front radar sensor 141a, so that the cleaning robot 1 may not sense the bottom of a bed, the bottom of a sofa, etc. as an obstacle.

Figure 13:
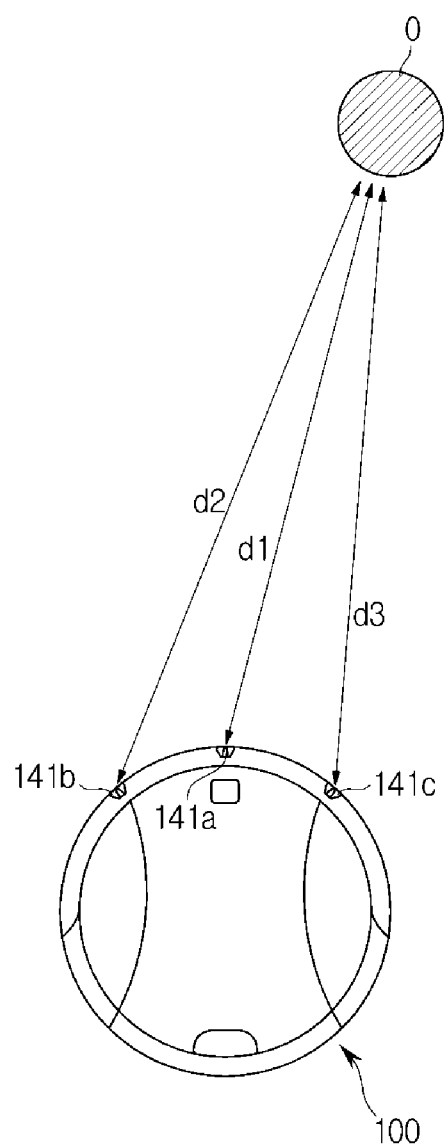
FIG. 13 is a diagram illustrating detecting the position of an obstacle using a front-obstacle sensing module included in a cleaning robot according to an exemplary embodiment.
Figure 14:
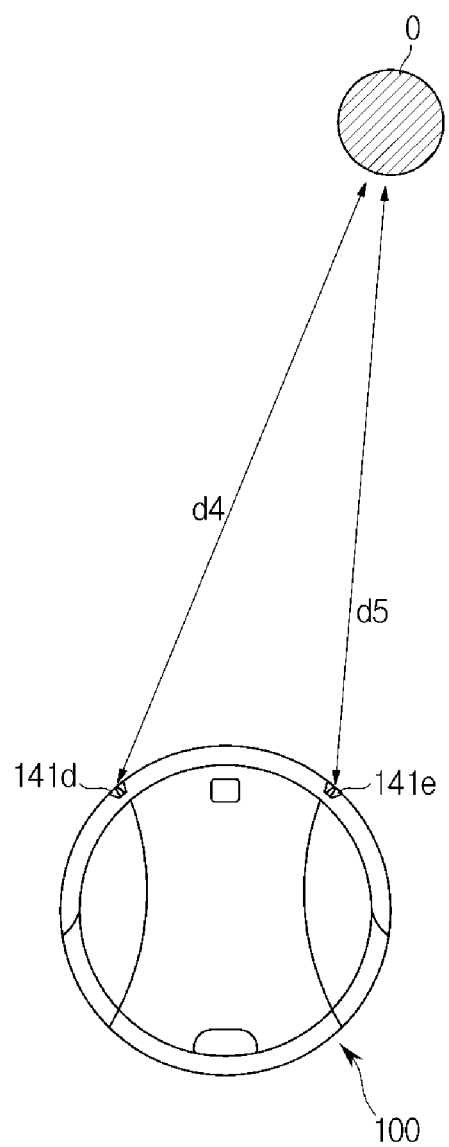
FIG. 14 is a diagram illustrating detecting the position of an obstacle using a front-obstacle sensing module included in a cleaning robot according to another exemplary embodiment.

FIG. 13 is a diagram illustrating detecting the position of an obstacle using a front-obstacle sensing module included in a cleaning robot according to an exemplary embodiment. FIG. 14 is a diagram illustrating detecting the position of an obstacle using a front-obstacle sensing module included in a cleaning robot according to another embodiment.

The front obstacle sensing unit 140 may include three front radar sensors 141a, 141b, and 141c as illustrated in FIG. 13.

When the front-obstacle sensing module 141 includes the three front radar sensors 141a, 141b, and 141c as illustrated in FIG. 13, the front-obstacle sensing module 141 may detect distances d1, d2, and d3 between the three front radar sensors 141a, 141b, and 141c and a front obstacle O.

For example, in the front-obstacle sensing module 141, the three front radar sensors 141a, 141b, and 141c emit sensing radio waves at predetermined time intervals and detect radio waves reflected from the front obstacle O to detect the distances d1, d2, and d3 between the three front radar sensors 141a, 141b, and 141c and the front obstacle O.

In detail, the first front radar sensor 141a may emit a sensing radio wave and detect a reflected radio wave to detect the first distance d1. The second front radar sensor 141b may emit a sensing radio wave and detect a reflected radio wave to detect the second distance d2. Also, the third front radar sensor 141c may emit a sensing radio wave and detect a reflected radio wave to detect the third distance d3.

When the distances d1, d2, and d3 between the front radar sensors 141a, 141b, and 141c and the front obstacle O are detected, the cleaning robot 100 may calculate the position of the front obstacle O by applying to triangulation a distance D among the front radar sensors 141a, 141b, and 141c and the distances d1, d2, and d3 between the three front radar sensors 141a, 141b, and 141c and the front obstacle O.

The triangulation is a technique well known to technicians of ordinary skill and is thus not described in detail here.

The front-obstacle sensing module 141 includes the three front radar sensors 141a, 141b, and 141c to detect location information of the front obstacle O but is not limited thereto. That is, the front-obstacle sensing module 141 may include one or two front radar sensors or may include four or more front radar sensors.

The front obstacle sensing unit 140 may include two front radar sensors as 141d and 141e illustrated in FIG. 14.

When the front-obstacle sensing module 141 includes the two front radar sensors 141d and 141e as illustrated in FIG. 14, the front-obstacle sensing module 141 may detect distances d4 and d5 between the two front radar sensors 141d and 141e and a front obstacle O.

For example, in the front-obstacle sensing module 141, the two front radar sensors 141d and 141e may emit sensing radio waves at predetermined time intervals and detect radio waves reflected from the front obstacle O to detect the distances d4 and d5 between the two front radar sensors 141d and 141e and the front obstacle O.

When the distances d4 and d5 between the two front radar sensors 141d and 141e and the front obstacle O are detected, the cleaning robot 100 may calculate the position of the front obstacle O by applying to triangulation a distance D between the front radar sensors 141d and 141e and the distances d4 and d5 between the two front radar sensors 141d and 141e and the front obstacle O.

The floor-obstacle sensing module 143 may sense a floor obstacle O which interrupts movement of the cleaning robot 100 at a floor of a space to be cleaned. Here, the floor obstacle O that may be sensed by the floor-obstacle sensing module 143 may be a door sill, wire, etc. which is located at a location lower than the height of the main body 101. The floor obstacle O such as a door sill, wire, etc. is located at the location lower than the height of the main body 101 and may be thus not sensed by the front-obstacle sensing module 141.

As described above, the front-obstacle sensing module 141 emits a sensing radio wave having a limited vertical emission angle in front of the main body 101, and receives a radio wave reflected from the front obstacle O.

In contrast, the floor-obstacle sensing module 143 emits a sensing radio wave toward the floor of the space to be cleaned and receives a radio wave reflected from the floor obstacle O. The cleaning robot 100 may sense the floor obstacle O (e.g., wire, a door sill, etc.) located on the floor of the space and detect the distance d to the floor obstacle O using the floor-obstacle sensing module 143.

Also, the cleaning robot 100 may determine the quality of a material of the floor of the space, based on the waveform of a reflected radio wave received by the floor-obstacle sensing module 143.

Figure 15:
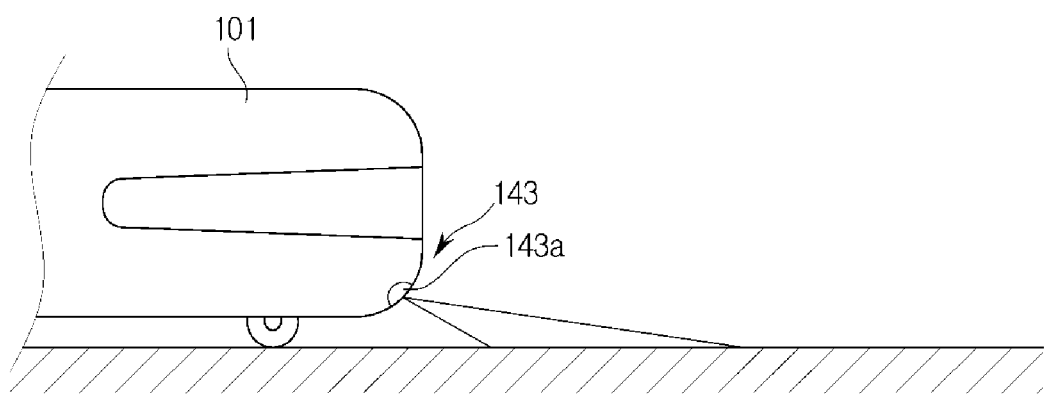
FIG. 15 is a diagram illustrating a range of sensing signals emitted from a floor-obstacle sensing module included in a cleaning robot according to an exemplary embodiment.
Figure 16:
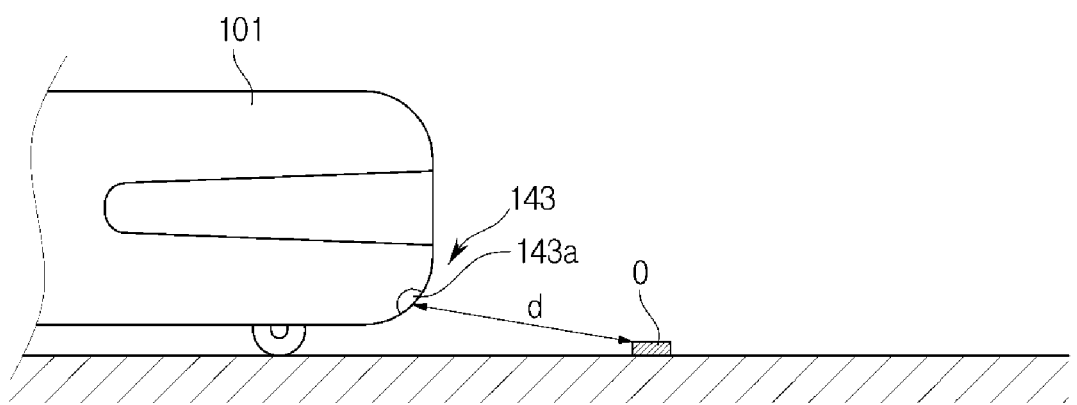
FIG. 16 is a diagram illustrating sensing the position of an obstacle using a floor-obstacle sensing module included in a cleaning robot according to an exemplary embodiment.

FIG. 15 is a diagram illustrating a range of sensing signals emitted from a floor-obstacle sensing module included in a cleaning robot according to an exemplary embodiment. FIG. 16 is a diagram illustrating sensing the position of an obstacle using a floor-obstacle sensing module included in a cleaning robot according to an exemplary embodiment.

As illustrated in FIGS. 15 and 16, the floor-obstacle sensing module 143 may include a floor radar sensor 143a provided in the front of the main body 101. The floor radar sensor 143a may emit a sensing radio wave toward a floor of a space to be cleaned to detect an obstacle on the floor of the space.

The floor radar sensor 143a is provided on a lower portion of the front of the main body 101 but is not limited thereto, and the position thereof is not limited provided that the floor radar sensor 143a can emit a sensing signal toward a floor of the front of the main body 101.

The floor radar sensor 143a emits a sensing radio wave toward the floor of a space to be cleaned and detects a signal reflected from a floor obstacle O present on the floor of the space. When the reflected signal is detected, the floor radar sensor 143a may detect a time difference between time when the sensing radio wave is emitted and time when the reflected signal is received (hereinafter referred to as a 'reflected-signal sensing time').

When the floor radar sensor 143a detects the reflected-signal sensing time, the cleaning robot 100 may calculate a distance d from the floor radar sensor 143a to the floor obstacle O based on the reflected-signal sensing time, and calculate the distance to the floor obstacle O based on the distance d.

Also, the cleaning robot 100 may determine the shape of the floor obstacle O and whether the floor of the space to be cleaned is a hard-material floor (e.g., a wooden floor) or a soft-material floor (e.g., a floor covered with a carpet, etc.), based on the waveform of a reflected radio wave received by the floor radar sensor 143a.

As described above, the cleaning robot 100 may not only detect the presence and location information of an obstacle O (e.g., wire, a door sill, etc.) located on a floor of a space to be cleaned but also determine a material of the floor of the space to be cleaned by using the floor radar sensor 143*a* included in the floor-obstacle sensing module 143.

As described above, the obstacle sensing unit 140 may detect the presence and position of an obstacle O using UWB radio waves but exemplary embodiments of the present invention are not limited thereto.

For example, the obstacle sensing unit 140 may include a plurality of infrared sensor modules that emit infrared rays and measure the intensity of infrared rays reflected from an obstacle to detect the presence of the obstacle and the distance to the obstacle.

The main body 101 may determine the position of an obstacle by installing the plurality of infrared sensor modules on the front, left and right sides of the main body 101 at predetermined intervals. In other words, an obstacle may be determined to be located in front of the cleaning robot 100 when the obstacle is sensed by an infrared sensor module provided on the front of the main body 101, and determined to be located to a right side of the cleaning robot 100 when the obstacle is sensed by an infrared sensor module provided on the right side of the main body 101.

The obstacle sensing unit 140 may further include a camera module, a sound wave sensor module, etc.

The structure of the user terminal 200 will be described below.

Figure 17:
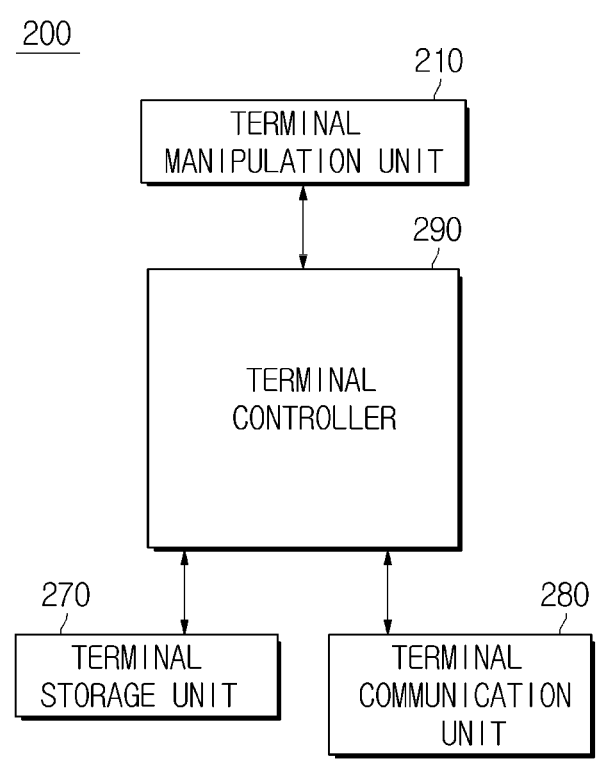
FIG. 17 is a block diagram illustrating the flow of controlling a user terminal according to an exemplary embodiment.
Figure 18:
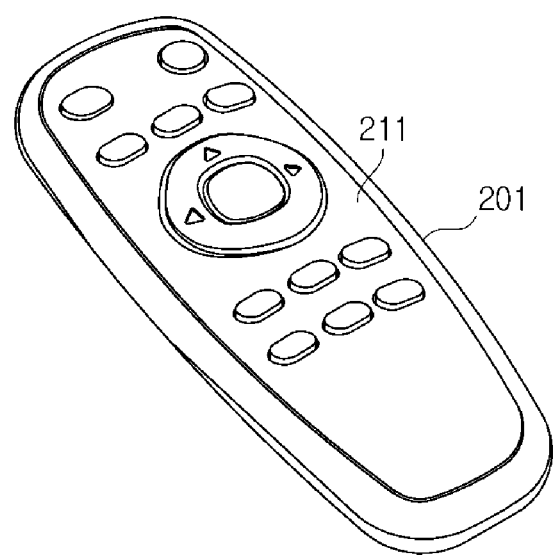
FIG. 18 is a perspective view of the exterior of a user terminal according to an exemplary embodiment.

FIG. 17 is a block diagram illustrating the flow of controlling a user terminal according to an exemplary embodiment. FIG. 18 is a perspective view of the exterior of a user terminal according to an exemplary embodiment.

Referring to FIGS. 17 and 18, the user terminal 200 includes a main body 201 forming the exterior of the user terminal 200. The main body 201 includes a terminal manipulation unit 210 configured to receive a manipulation command from a user, a terminal storage unit 270 that stores a program and data for controlling the user terminal 200, a terminal communication unit 280 that communicates with the cleaning robot 100, etc., and a terminal controller 290 that controls an operation of the user terminal 200.

The terminal manipulation unit 210 includes a plurality of manipulation buttons 211 provided on a top surface of the main body 201 and configured to receive a manipulation command related to the cleaning robot 100 from a user. The plurality of manipulation buttons 211 may include a power button for controlling the cleaning robot 100 to be on/off; a cleaning-mode selection button for selecting a cleaning mode, e.g., an automatic cleaning mode, a manual cleaning mode, etc. of the cleaning robot 100; an 'operate/stop' command button for instructing the cleaning robot 100 to be operated or stopped; a 'charge/return' command button for instructing the cleaning robot 100 to be returned to a charging station (not shown); a manual driving manipulation button for manually manipulating driving of the cleaning robot 100, etc. The plurality of manipulation buttons 211 may employ a micro-switch or a membrane switch for detecting pressure applied by a user, a touch pad for detecting the user's touch, etc.

The terminal storage unit 270 may include not only a nonvolatile memory (not shown), such as a magnetic disc, a semiconductor disk (e.g., a solid state disk), etc., which permanently stores a control program and control data for controlling an operation of the user terminal 200, but also a volatile memory (not shown), such as a DRAM, an SRAM, etc., which temporarily stores temporary data generated during controlling of the operation of the user terminal 200.

The terminal communication unit 280 may include the terminal UWB communication module 281 that communicates with the cleaning robot 100 according to a UWB wireless communication method. However, exemplary embodiments of the present invention are not limited thereto, and the terminal communication unit 280 may include a terminal data communication module (not shown) that establishes wireless communication according to a wireless communication method using W-Fi, Bluetooth, Zigbee, NFC, etc.

The terminal controller 290 transmits a manipulation command received from a user via the terminal manipulation unit 210 to the cleaning robot 100 via the terminal communication unit 280. In particular, when a cleaning robot call command is received from a user via the terminal manipulation unit 210, the terminal controller 290 controls the terminal communication unit 280 to transmit the cleaning robot call command to the cleaning robot 100. Also, the terminal controller 290 may calculate the position of the user terminal 200 using a time difference between a transmitted signal and a received signal.

The user terminal 200 according to an exemplary embodiment is embodied as an exclusive remote control manufactured to manipulate the cleaning robot 100 but is not limited thereto. A general-purpose portable terminal capable of establishing voice communication and data communication with various home appliances through wireless communication may be employed as the user terminal 200. In particular, when such a general-purpose portable terminal is employed, the portable terminal may be controlled to function as the user terminal 200 by installing an additional program in the portable terminal to manipulate and communicate with the cleaning robot 100.

The structures of the cleaning robot 100 and the user terminal 200 according to an exemplary embodiment have been described above.

Operations of the cleaning robot 100 and the user terminal 200 according to an exemplary embodiment will be described below.

When a user U calls the cleaning robot 100, the cleaning robot 100 may detect the position of the user terminal 200 that the user U carries with him/herself and then move to the user U. When the user U instructs the cleaning robot 100 to follow the user U, the cleaning robot 100 may detect the position of the user terminal 200 that the user U carries with him/herself and follow the user U. When the user U instructs the cleaning robot 100 to perform manual cleaning, the cleaning robot 100 may clean a space to be cleaned while moving along a trajectory of the user terminal 200. When the user U designates a position to be cleaned using the user terminal 200, the cleaning robot 100 may move to the designated position.

First, detecting of the user U's position, performed by the cleaning robot 100, will be described below.

Figure 19:
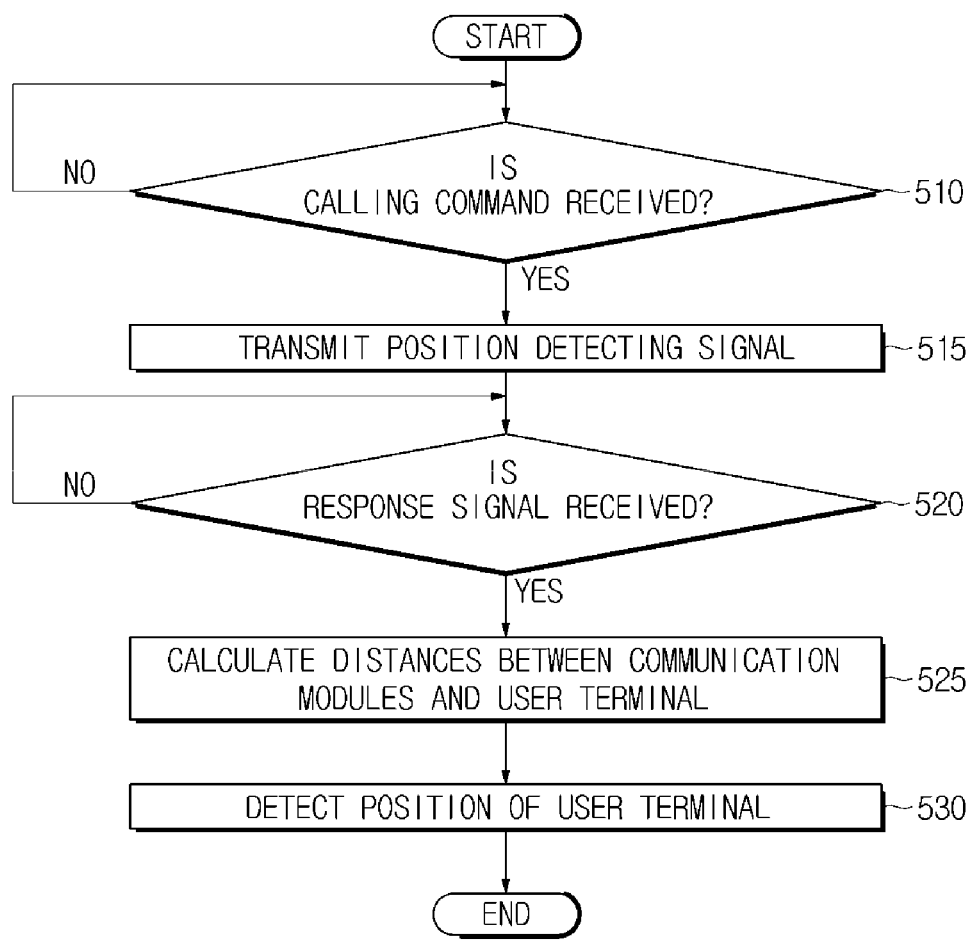
FIG. 19 is a flowchart of a method of detecting the position of a user terminal, the method performed by a cleaning robot, according to an exemplary embodiment.
Figure 20:
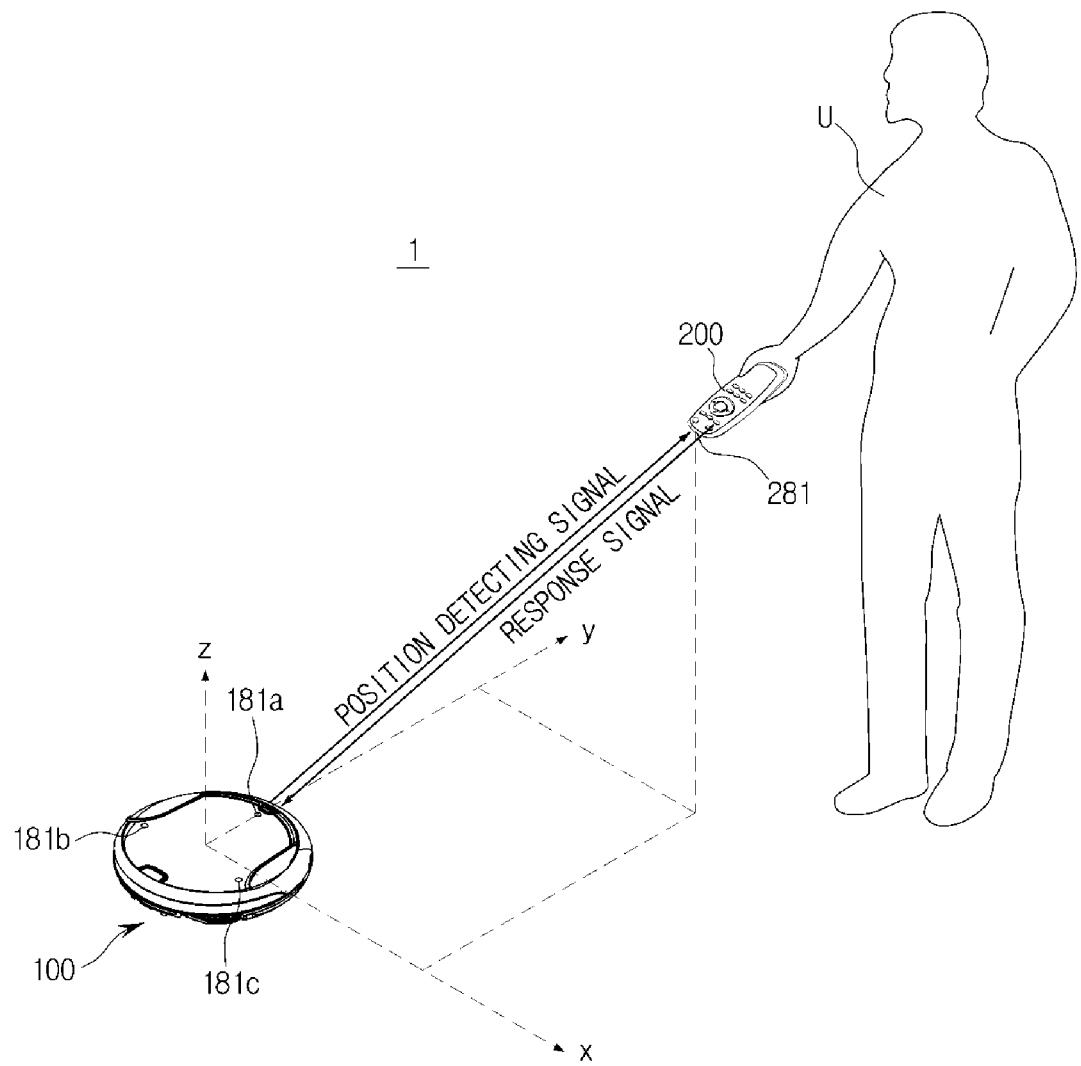
FIG. 20 is a diagram illustrating detecting a distance between an ultra-wide band (UWB) communication module and a user terminal, performed by a cleaning robot, according to an exemplary embodiment.
Figure 21:
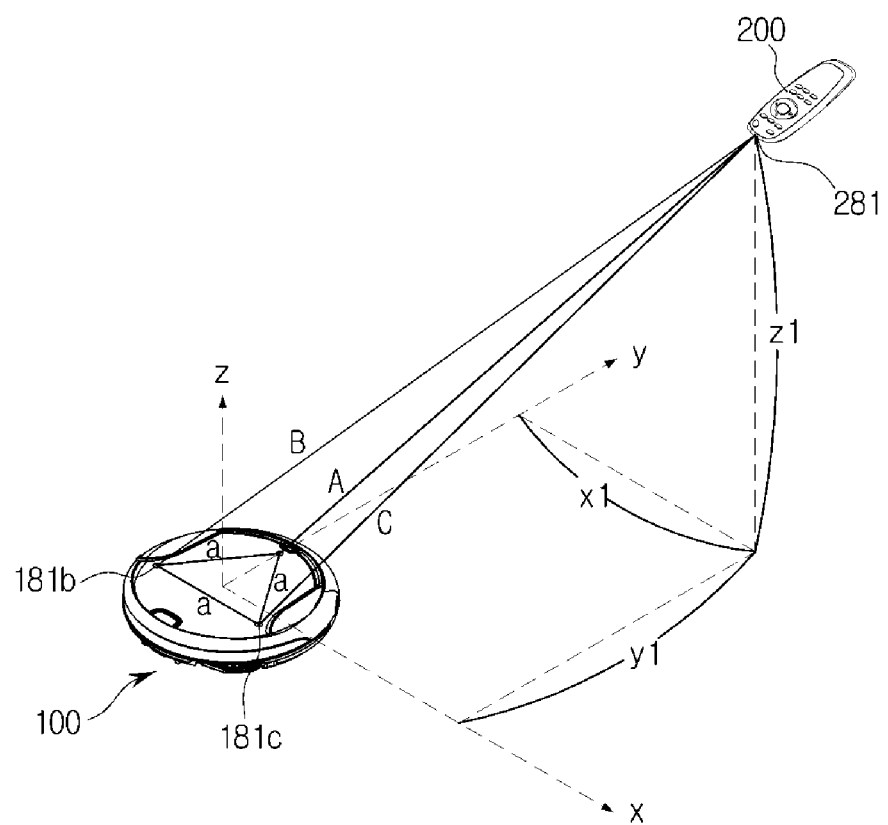
FIG. 21 is a diagram illustrating calculating the position of a user terminal, performed by a cleaning robot, according to an exemplary embodiment.

FIG. 19 is a flowchart of a method of detecting the position of a user terminal, the method performed by a cleaning robot, according to an exemplary embodiment. FIG. 20 is a diagram illustrating detecting a distance between a UWB communication module and a user terminal, performed by a cleaning robot, according to an exemplary embodiment. FIG. 21 is a diagram illustrating calculating the position of a user terminal, performed by a cleaning robot, according to an exemplary embodiment.

Referring to FIGS. 19 to 21, a cleaning robot 100 determines whether a calling command is received from a user (operation S510).

In detail, the cleaning robot 100 determines whether a user's calling command is received from a user terminal 200. When the user does not know the position of the cleaning robot 100, the user may input the calling command to the cleaning robot 100 via the user terminal 200. The calling command is transmitted from the user terminal 200 to the cleaning robot 100 via a terminal UWB communication module 281 of the user terminal 200 and a robot UWB communication module 181 of the cleaning robot 100 as illustrated in FIG. 20.

When it is determined that the calling command is received (when 'Yes' in operation S510), the cleaning robot 100 transmits a position detecting signal to the user terminal 200 (operation S515).

In detail, as illustrated in FIG. 20, the cleaning robot 100 transmits the position detecting signal to the user terminal 200 via at least one among first to third robot UWB communication modules 181*a*, 181*b*, and 181*c*.

Next, the cleaning robot 100 determines whether a response signal is received from the user terminal 200 (operation S520).

When the position detecting signal is received via the terminal UWB communication module 281, the user terminal 200 transmits the response signal to the cleaning robot 100 via the terminal UWB communication module 281. The cleaning robot 100 determines whether the response signal is received.

When it is determined that the response signal is received (when 'Yes' in operation S520), the cleaning robot 100 calculates the distances between the robot UWB communication modules 181*a*, 181*b*, and 181*c* of the cleaning robot 100 and the terminal UWB communication module 281 of the user terminal 200 (operation S525).

In detail, the cleaning robot 100 may calculate the distances between the robot UWB communication modules 181*a*, 181*b*, and 181*c* of the cleaning robot 100 and the terminal UWB communication module 281 of the user terminal 200, based on a time difference between time when the position detecting signal is transmitted to the user terminal 200 and time when the response signal is received from the user terminal 200.

The cleaning robot 100 may calculate the distances between the first to third robot UWB communication modules 181*a*, 181*b*, and 181*c* and the terminal UWB communication module 281 by subtracting a time during which the user terminal 200 receives the position detecting signal and transmits the response signal from the time difference between the position detecting signal and the response signal, multiplying a result of the subtraction by the speed of radio waves, and dividing a result of the multiplication by '2'.

In order to calculate the distances between the first to third robot UWB communication modules 181*a*, 181*b*, and 181*c* and the terminal UWB communication module 281, the cleaning robot 100 may calculate the distances by controlling the first to third robot UWB communication modules 181*a*, 181*b*, and 181*c* to simultaneously transmit position detecting signals. Alternatively, the cleaning robot 100 may sequentially calculate the distances by sequentially controlling the first robot UWB communication module 181*a*, the second robot UWB communication module 181*b*, and the third robot UWB communication module 181*c* to transmit position detecting signals.

As described above, as illustrated in FIG. 20, the cleaning robot 100 may calculate a first distance A between the first robot UWB communication module 181*a* and the terminal UWB communication module 281, a second distance B between the second robot UWB communication module 181*b* and the terminal UWB communication module 281, and a third distance C between the third robot UWB communication module 181*c* and the terminal UWB communication module 281.

After the first distance A, the second distance B, and the third distance C are calculated, the cleaning robot 100 detects a position of the user terminal 200 using triangulation (operation S530).

In other words, the cleaning robot 100 calculates the coordinates of the user terminal 200 in a coordinate system (in which the position of the cleaning robot 100 is set as an origin) using triangulation. In detail, the cleaning robot 100 calculates the coordinates of the user terminal 200 by substituting the first distance A, the second distance B, and the third distance C into Equations 1, 2, and 3 below.

$$X1 = \frac{-A^2 + C^2}{2a} \quad \text{[Equation 1]}$$

(In Equation 1, 'X1' denotes an X-axis coordinate of a user terminal, 'A' denotes a first distance between a first robot UWB communication module and a terminal UWB communication module, 'B' denotes a second distance between a second robot UWB communication module and the terminal UWB communication module, 'C' denotes a third distance between a third robot UWB communication module and the terminal UWB communication module, and 'a' denotes a distance between the first to third robot UWB communication modules.)

$$Y1 = \frac{A^2 - 2B^2 + C^2}{2\sqrt{3}\, a} \quad \text{[Equation 2]}$$

(In Equation 2, 'Y1' denotes a Y-axis coordinate of the user terminal, 'A' denotes the first distance between the first robot UWB communication module and the terminal UWB communication module, 'B' denotes the second distance between the second robot UWB communication module and the terminal UWB communication module, 'C' denotes the third distance between the third robot UWB communication module and the terminal UWB communication module, and 'a' denotes the distance between the first to third robot UWB communication modules.)

$$Z1 = \frac{\sqrt{A^2 B^2 + B^2 C^2 + C^2 A^2 + a^2(A^2 + B^2 + C^2) - A^4 - B^4 - C^4 - a^4}}{\sqrt{3}\, a} \quad \text{[Equation 3]}$$

(In Equation 3, 'Z1' denotes a Z-axis coordinate of the user terminal, 'A' denotes the first distance between the first robot UWB communication module and the terminal UWB communication module, 'B' denotes the second distance between the second robot UWB communication module and the terminal UWB communication module, 'C' denotes the third distance between the third robot UWB communication module and the terminal UWB communication module, and 'a' denotes the distance between the first to third robot UWB communication modules.)

As described above, the cleaning robot 100 may calculate the position of the user terminal 200 using a time difference between a position detecting signal and a response signal and using triangulation, and detect the user's position based on the position of the user terminal 200.

When the user's position is detected, the cleaning robot 100 may move to the user's position.

In the cleaning robot 100 and the user terminal 200 according to an exemplary embodiment, the cleaning robot 100 transmits a position detecting signal and the user terminal 200 transmits a response signal to detect the position of the user terminal 200, but exemplary embodiments are not limited thereto. For example, the user terminal 200 may transmit the position detecting signal, the cleaning robot 100 may transmit the response signal, and the user terminal 200 may calculate the coordinates thereof and transmit the coordinates to the cleaning robot 100.

Next, following the user U by the cleaning robot 100 will be described below.

Figure 22:
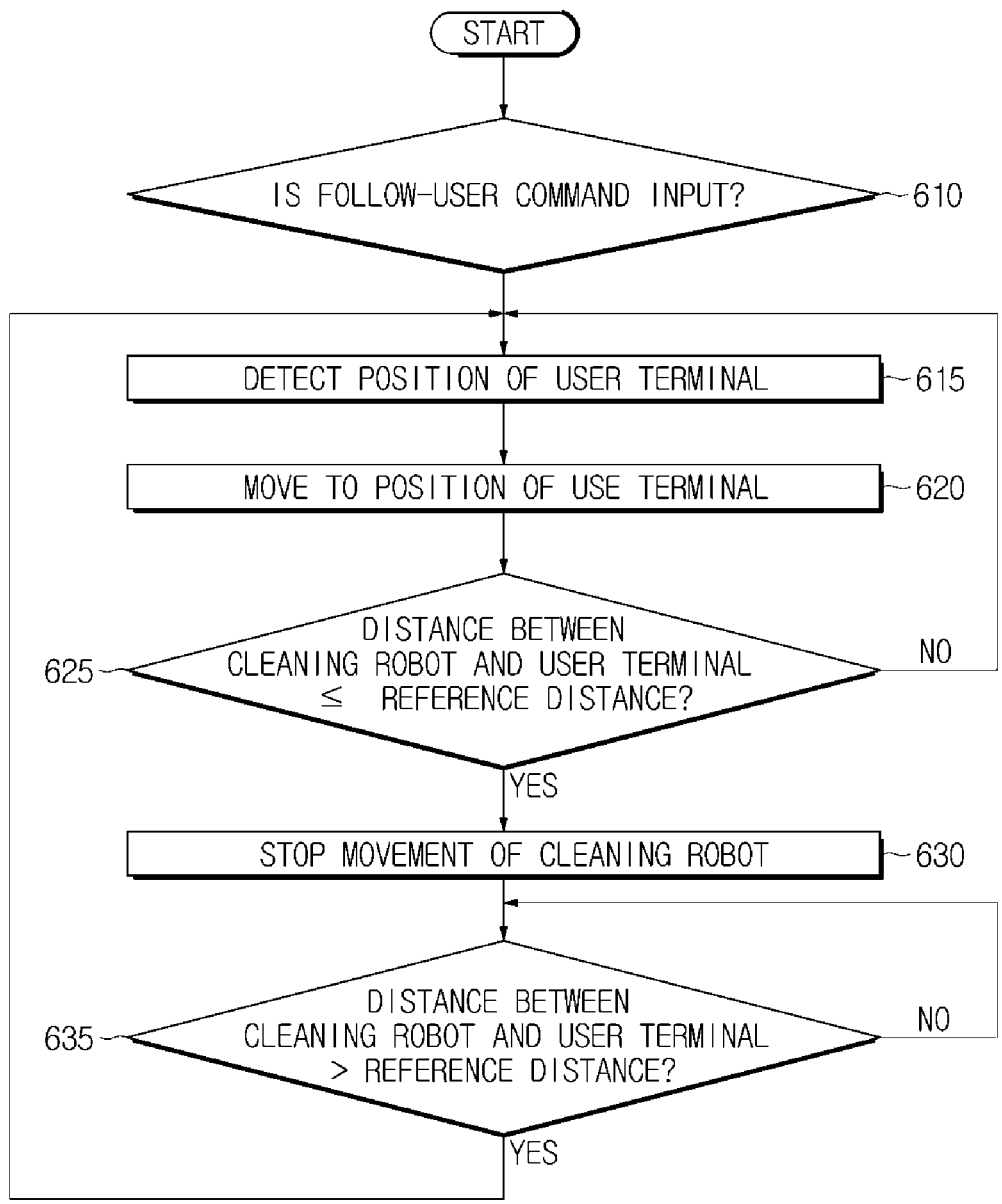
FIG. 22 is a flowchart of a method of following a user terminal, the method performed by a cleaning robot, according to an exemplary embodiment.
Figure 23:
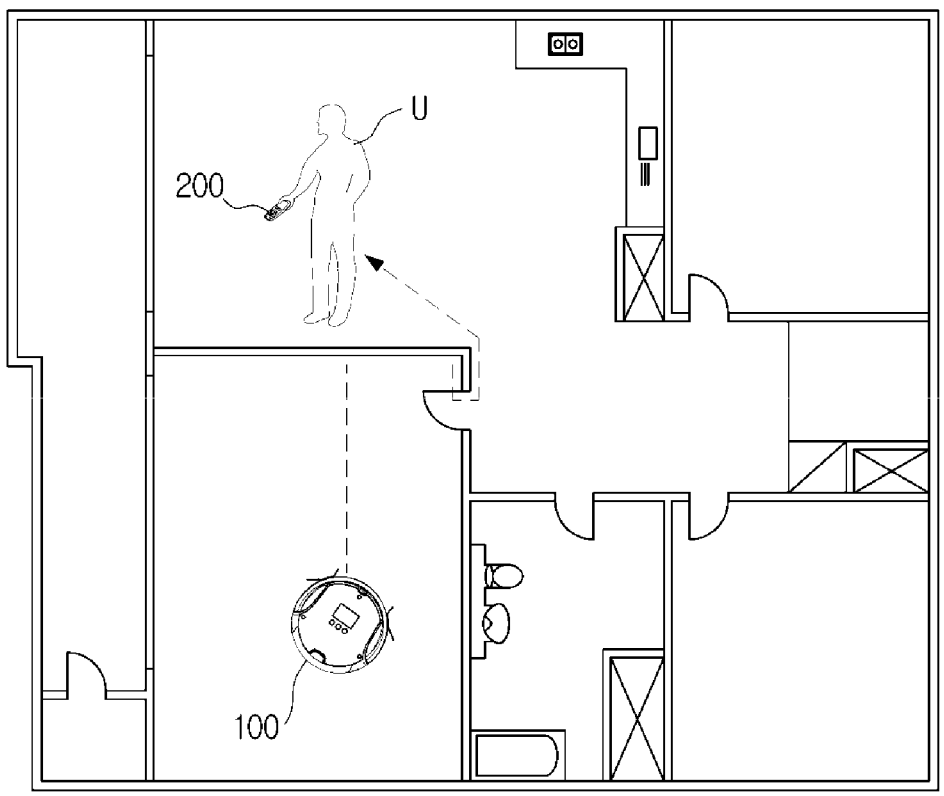
FIG. 23 is a diagram illustrating moving of a cleaning robot to the position of a user terminal according to an exemplary embodiment.

FIG. 22 is a flowchart of a method of following a user terminal, the method performed by a cleaning robot, according to an exemplary embodiment. FIG. 23 is a diagram illustrating moving of a cleaning robot to the position of a user terminal according to an exemplary embodiment.

Referring to FIGS. 22 and 23, a cleaning robot 100 determines whether a 'follow' command is input from a user (operation S610).

In detail, the cleaning robot 100 determines whether a user's calling command is received from the user terminal 200. When the user wants to first clean a specific location in a space to be cleaned, the user may input the 'follow' command to the cleaning robot 100 via the user terminal 200. The 'follow' command is transmitted from the user terminal 200 to the cleaning robot 100 via the UWB communication module 181 or 281 or the robot data communication module 183.

When it is determined that the 'follow user' command is received (when 'Yes' in operation S610), the cleaning robot 100 detects the position of a user U (operation S615).

Since the user U carries the user terminal 200 with him/herself, the cleaning robot 100 may detect the user U's position by detecting the position of the user terminal 200 according to the method illustrated in FIGS. 19 to 21.

After the user U's position is detected, the cleaning robot 100 moves to the position of the user terminal 200 (operation S620).

The cleaning robot 100 calculates a shortest route to the position of the user terminal 200 and moves along the shortest route as illustrated in FIG. 23.

When an obstacle is sensed while the cleaning robot 100 moves along the calculated shortest route, the cleaning robot 100 may move along the outline of the obstacle. When the obstacle is not located in a direction toward the user terminal 200 while the cleaning robot 100 moves along the obstacle, the cleaning robot 100 may calculate another shortest route to the user terminal 200 and move along the other calculated shortest route.

Then, the cleaning robot 100 determines whether a distance between the cleaning robot 100 and the user terminal 200 is less than or equal to a reference distance (operation S625).

The distance between the user terminal 200 and the cleaning robot 100 may be equal to a distance between any one robot UWB communication module 181 among two or more robot UWB communication modules 181a, 181b, and 181c included in the cleaning robot 100 and the user terminal 200. Also, the distance to the user terminal 200 may be calculated based on the coordinates of the user terminal 200.

The cleaning robot 100 may compare the distance between the cleaning robot 100 and the user terminal 200 calculated as described above with the reference distance.

When it is determined that the distance between the cleaning robot 100 and the user terminal 200 is greater than the reference distance (when 'No' in operation S625), the cleaning robot 100 may detect the position of the user terminal 200 and move to the position of the user terminal 200.

When it is determined that the distance between the cleaning robot 100 and the user terminal 200 is less than or equal to the reference distance (when 'Yes' in operation S625), the driving of the cleaning robot 100 ends (operation S630).

After the driving of the cleaning robot 100 ends, the cleaning robot 100 determines whether the distance between the cleaning robot 100 and the user terminal 200 is greater than the reference distance (operation S635).

When the user U moves again after the cleaning robot 100 accesses the user U, the cleaning robot 100 should access the user U again and thus determines whether the distance between the cleaning robot 100 and the user terminal 200 is greater than the reference distance.

When it is determined that the distance between the cleaning robot 100 and the user terminal 200 is greater than the reference distance (when 'Yes' in operation S635), the cleaning robot 100 detects the position of the user terminal 200 and moves to the position of the user terminal 200.

Following the user U by the cleaning robot 100 as described above is repeatedly performed until the user U inputs an 'end follow' command.

According to an exemplary embodiment, the cleaning robot 100 determines whether it accesses the user U, based on the distance between the cleaning robot 100 and the user terminal 200, but exemplary embodiments of the present invention are not limited thereto and the coordinates of the user terminal 200 may be controlled to be in a specific range. For example, the cleaning robot 100 may move such that the user terminal 200 is located at the coordinates (X2±α, Y2±α, Z2).

Next, a manual cleaning method of cleaning a space to be cleaned while moving along a trajectory of the user terminal 200, the method performed by the cleaning robot 100, will be described below.

Figure 24:
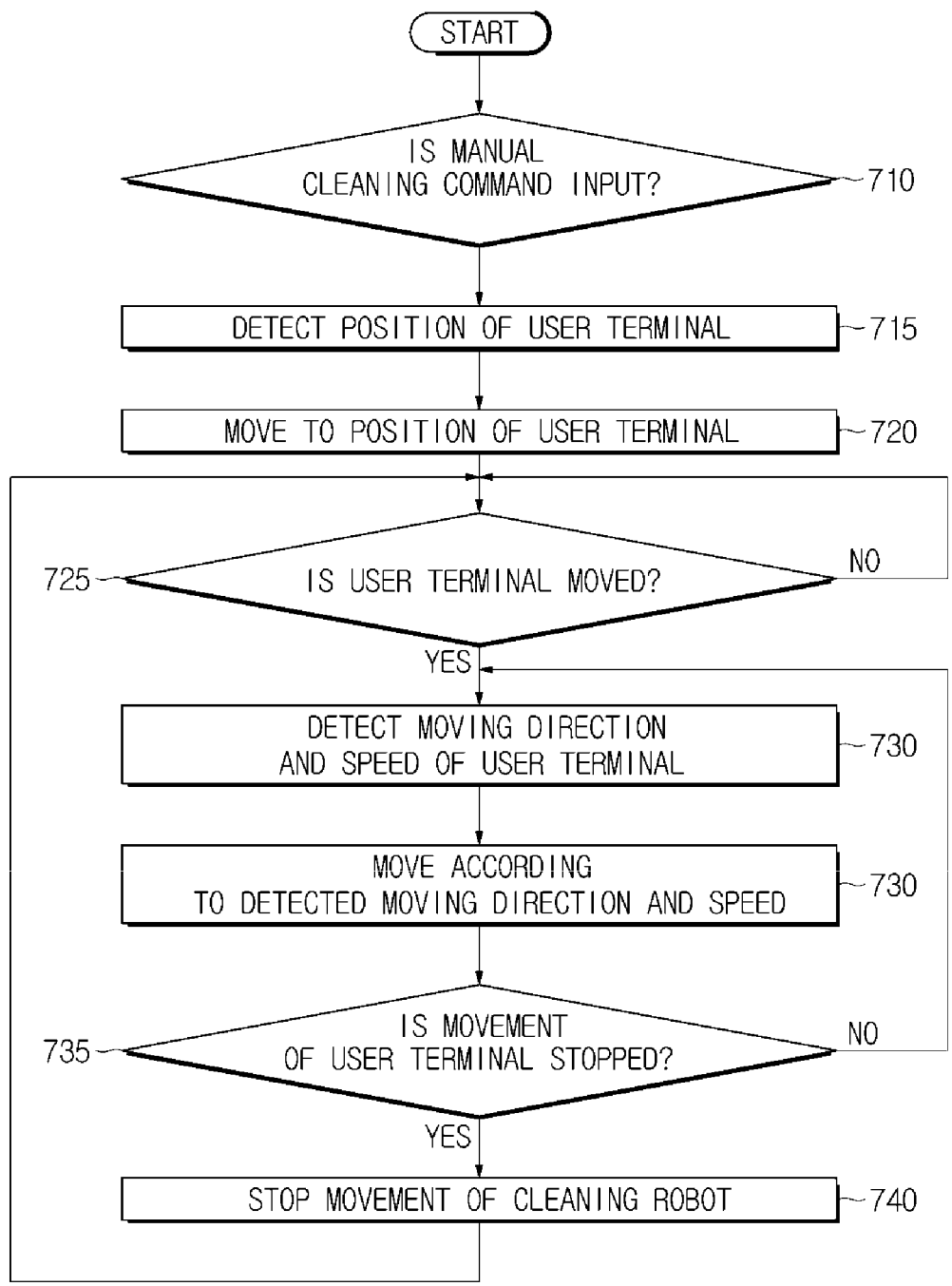
FIG. 24 is a flowchart of a method of performing cleaning while following a moving trajectory of a user terminal, the method performed by a cleaning robot, according to an exemplary embodiment.
Figure 25:
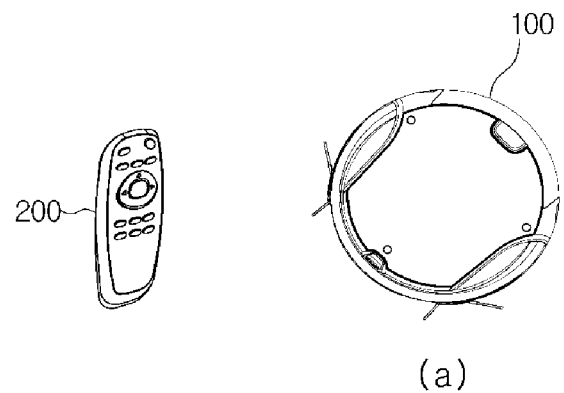
FIG. 25 is a diagram illustrating performing cleaning while following a moving trajectory of a user terminal, performed by a cleaning robot, according to an exemplary embodiment.
Figure 25:
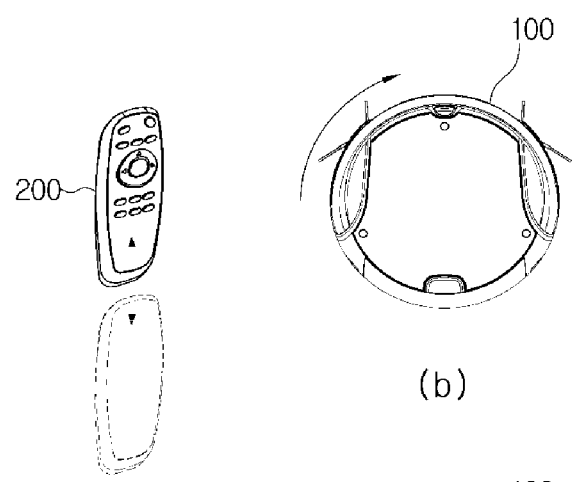
Figure 25:
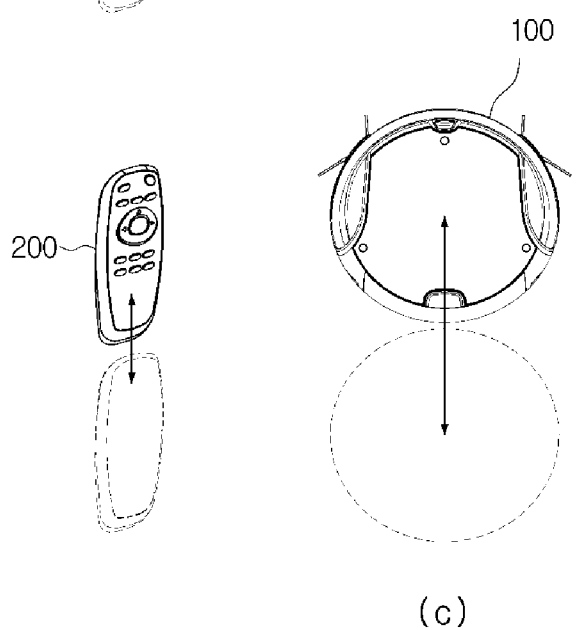

FIG. 24 is a flowchart of a method of performing cleaning while following a moving trajectory of a user terminal, performed by a cleaning robot, according to an exemplary embodiment. FIG. 25 is a diagram illustrating performing cleaning while following a moving trajectory of a user terminal, performed by a cleaning robot, according to an exemplary embodiment.

Referring to FIGS. 24 and 25, a cleaning robot 100 determines whether a manual cleaning command is input from a user (operation S710).

In detail, the cleaning robot 100 may determine whether the manual cleaning command is input from the user via the user terminal 200.

When the user wants to manually clean a specific location in a space to be cleaned, the user may input the manual cleaning command to the cleaning robot 100 via the user terminal 200. The manual cleaning command is transmitted from the user terminal 200 to the cleaning robot 100 via the UWB communication module 181 or 281 or the robot data communication module 183.

When it is determined that the manual cleaning command is received (when 'Yes' in operation S710), the cleaning robot 100 detects the position of the user U (operation S715).

In detail, since the user U carries the user terminal 200 with him/herself, the cleaning robot 100 may detect the user U's position by detecting the position of the user terminal 200 according to the method illustrated in FIGS. 19 to 21.

After the position of the user terminal 200 is detected, the cleaning robot 100 moves to a predetermined position of the user terminal 200 (operation S720).

For example, as illustrated in FIG. 25(*a*), the cleaning robot 100 may move directly below the user terminal 200 or such that the position of the user terminal 200 has specific coordinates.

Thereafter, the cleaning robot 100 determines whether the user terminal 200 is moved (operation S725).

In order to intensively clean the specific location in the space to be cleaned, the user may move the user terminal 200 in forward and backward directions. The cleaning robot 100 may sense movement of the user terminal 200 by periodically detecting the position of the user terminal 200.

When the movement of the user terminal 200 is sensed (when 'Yes' in operation S725), the cleaning robot 100 detects a moving direction and speed of the user terminal 200 (operation S730).

In detail, the cleaning robot 100 may detect the moving direction and speed of the user terminal 200 by periodically detecting the position of the user terminal 200 and comparing the detected position with a previously detected position of the user terminal 200.

Thereafter, the cleaning robot 100 moves according to the detected moving direction and speed of the user terminal 200 (operation S735).

In detail, the cleaning robot 100 rotates in the moving direction of the user terminal 200 as illustrated in FIG. 25(*b*), and moves by a displacement by which the user terminal 200 moves and at the moving speed of the user terminal 200 as illustrated in FIG. 25(*c*).

In this case, the cleaning robot 100 cleans the space to be cleaned by operating the main brush 161 and the side brushes 163*a* and 163*b* illustrated in FIG. 9 of the cleaning unit 160 (see FIG. 5).

Then, the cleaning robot 100 determines whether the movement of the user terminal 200 is stopped (operation S740).

When it is determined that the movement of the user terminal 200 is stopped (when 'Yes' in operation S740), the cleaning robot 100 stops the movement thereof (operation S745).

In other words, when the cleaning of the specific location is ended during the manual cleaning and the user stops the movement of the user terminal 200, the cleaning robot 100 stops moving along the trajectory of the user terminal 200.

When it is determined that the movement of the user terminal 200 is not stopped (when 'No' in operation S740), the cleaning robot 100 repeatedly detects a moving direction and displacement of the user terminal 200 and moves along a moving trajectory of the user terminal 200.

Then, the cleaning robot 100 determines whether the user terminal 200 is moved (operation S725).

Also, when the cleaning robot 100 detects an obstacle during following of the user terminal 200, the cleaning robot 100 may transmit information related to the obstacle to the user terminal 200.

In detail, when movement of the cleaning robot 100 is interrupted by the obstacle, the cleaning robot 100 may transmit a 'can't follow' signal to the user terminal 200 and the user terminal 200 receiving the 'can't follow' signal may warn the user of the fact that the movement of the cleaning robot 100 is interrupted by the obstacle using vibration, sound, etc.

Also, while the cleaning robot 100 follows the user terminal 200, the cleaning robot 100 may transmit information related to the moving speed of the cleaning robot 100 to the user terminal 200.

In detail, when the moving speed of the user terminal 200 is equal to or greater than a reference speed, the cleaning robot 100 may transmit the 'can't follow' signal to the user terminal 200 and the user terminal 200 receiving the 'can't follow' signal may warn the user of the fact that the user's moving speed exceeds the reference speed using vibration, sound, etc.

As described above, the user may be allowed to recognize information related to the movement of the cleaning robot 100 by transmitting the information related to the movement of the cleaning robot 100 to the user terminal 200 while the cleaning robot 100 follows the user terminal 200.

Figure 26:
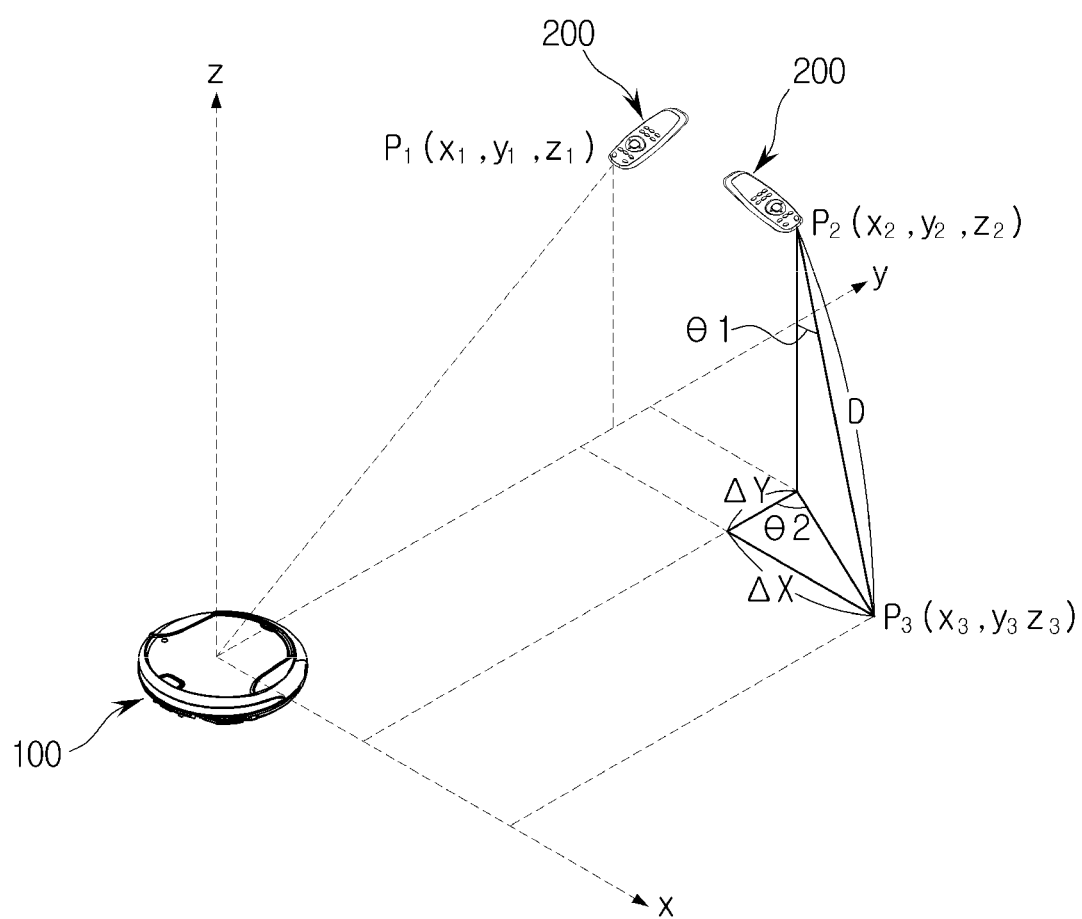
FIG. 26 is a diagram illustrating moving of a cleaning robot to a position indicated by a user terminal according to an exemplary embodiment.

FIG. 26 is a diagram illustrating moving of a cleaning robot to a position indicated by a user terminal according to an exemplary embodiment. In detail, FIG. 26 is a diagram illustrating recognizing a position designated by a user, performed by a cleaning robot 100, according to an exemplary embodiment.

In detail, the user may input a first designated-position cleaning command in a state in which a user terminal 200 faces the cleaning robot 100, and input a second designated-position cleaning command in a state in which the user terminal 200 faces a designated position.

For example, the user may press a designated-position cleaning button in a state in which the user terminal 200 faces the cleaning robot 100, and may stop pressing the designated-position cleaning button in a state in which the user terminal 200 faces a designated position P3.

When the first designated-position cleaning command is input from the user, the user terminal 200 transmits the first designated-position cleaning command to the cleaning robot 100.

Also, the cleaning robot 100 receiving the first designated-position cleaning command calculates the coordinates (X1, Y1, Z1) of a first position P1 representing a position of the user terminal 200 when the first designated-position cleaning command is input. In detail, the cleaning robot 100 may calculate the coordinates (X1, Y1, Z1) of the first position P1 of the user terminal 200 using the robot UWB communication module 181.

When the first position P1 of the user terminal 200 is calculated, the cleaning robot 100 may rotate such that the front of the cleaning robot 100 faces the user terminal 200.

When the second designated-position cleaning command is input from the user, the user terminal 200 provides the cleaning robot 100 with posture information of the user terminal 200 together with the second designated-position cleaning command. In order to detect the posture information of the user terminal 200, the user terminal 200 may further include a gyro sensor that senses rotational acceleration and an acceleration sensor that senses linear acceleration.

As illustrated in FIG. 26, the posture information of the user terminal 200 may include an indicative angle θ1 representing a direction indicating a designated position by the user terminal 200 relative to a vertical direction, and a rotation angle θ2 representing an angle between a direction indicating the cleaning robot 100 by the user terminal 200 and the direction indicating the designated position by the user terminal 200.

The cleaning robot 100 receiving the second designated-position cleaning command calculates the coordinates (X2, Y2, Z2) of a second position P2 representing a position of the user terminal 200 when the second designated-position cleaning command is input.

Thereafter, the cleaning robot 100 may calculate the coordinates (X3, Y3, Z3) of the designated position P3, based on the coordinates (X2, Y2, Z2) of the second position P2 of the user terminal 200 and the posture information (θ1, θ2) of the user terminal 200.

In detail, the cleaning robot 100 may calculate the coordinates (X3, Y3, Z3) of the designated position P3 using Equations 4 to 6 below.

$$D = \frac{Z2}{\cos\theta 1}$$ [Equation 4]

$$E = D \times \cos\left(\frac{\pi}{2} - \theta 1\right)$$

(In Equation 4, 'D' denotes a distance between the second position and the designated position, 'E' denotes a distance between a projection position obtained by projecting the second position upon the ground and the designated position, 'Z2' denotes a Z-axis coordinate of the second position, and 'θ1' denotes an indicative angle representing the direction indicated by the user terminal relative to the vertical direction.)

$$\Delta X = E \times \cos\left(\frac{\pi}{2} - \theta 1\right)$$ [Equation 5]

$$\Delta Y = E \times \cos(\theta 2)$$

('ΔX' denotes the difference between an X-axis coordinate of the second position and an X-axis coordinate of the designated position, denotes the difference between an Y-axis coordinate of the second position and a Y-axis coordinate of the designated position, 'E' denotes the distance between the projection position obtained by projecting the second position upon the ground and the designated position, 'θ1' denotes the indicative angle representing the direction indicated by the user terminal relative to the vertical direction, and 'θ2' denotes a rotation angle representing an angle by which the user terminal is rotated.)

$$X3 = X2 + \Delta X$$

$$Y3 = Y2 + \Delta Y$$ [Equation 6]

('X3' and 'Y3' respectively denote the X-axis coordinate and the Y-axis coordinate of the designated position, 'X2' and 'Y2' respectively denote the X-axis coordinate and the Y-axis coordinate of the second position, 'ΔX' denotes the difference between the X-axis coordinate of the second position and the X-axis coordinate of the designated position, and 'ΔY' denotes the difference between the Y-axis coordinate of the second position and the Y-axis coordinate of the designated position.)

As described above, the cleaning robot 100 may calculate the coordinates (X3, Y3, Z3) of the designated position P3, move to the designated position P3, and intensively perform cleaning at the designated position P3.

Detecting the position of the user terminal 200 and performing an operation based on the position of the user terminal 200, performed by the cleaning robot 100, have been described above.

Detecting a physical position of a user U and performing an operation based on the physical position of the user U, performed by the cleaning robot 100, will be described below.

Figure 27:
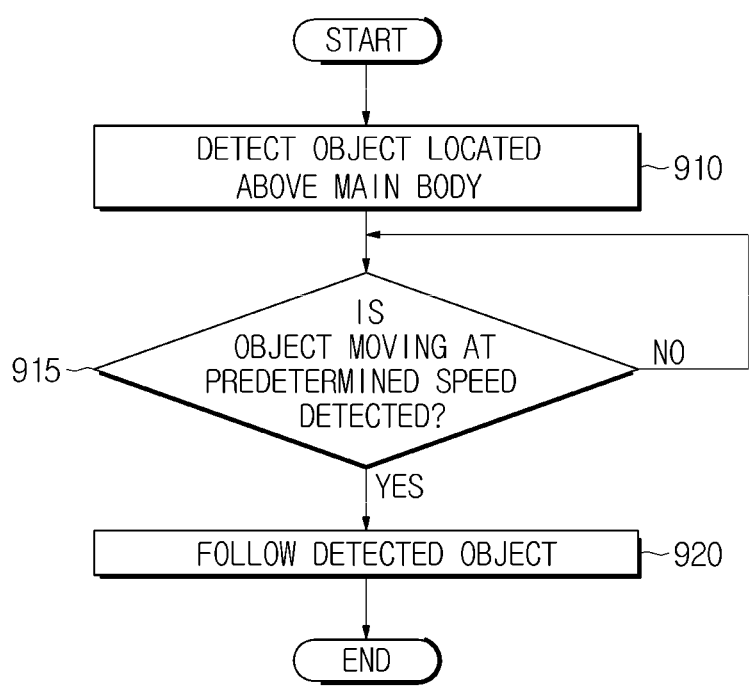
FIG. 27 is a flowchart of a method of detecting and following a physical position of a user U, the method performed by a cleaning robot, according to an exemplary embodiment.
Figure 28:
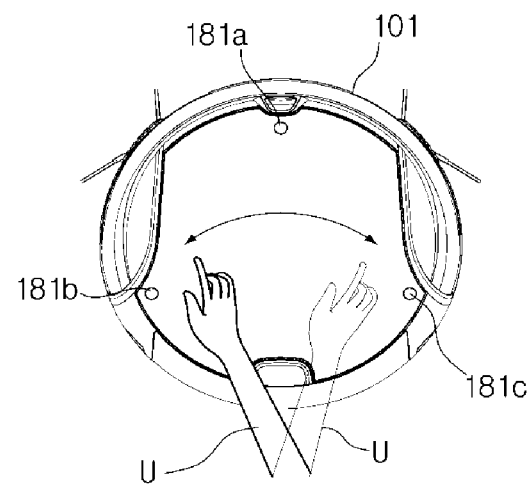
FIG. 28 is a diagram illustrating detecting and following a physical position of a user U, performed by a cleaning robot, according to an exemplary embodiment.
Figure 28:
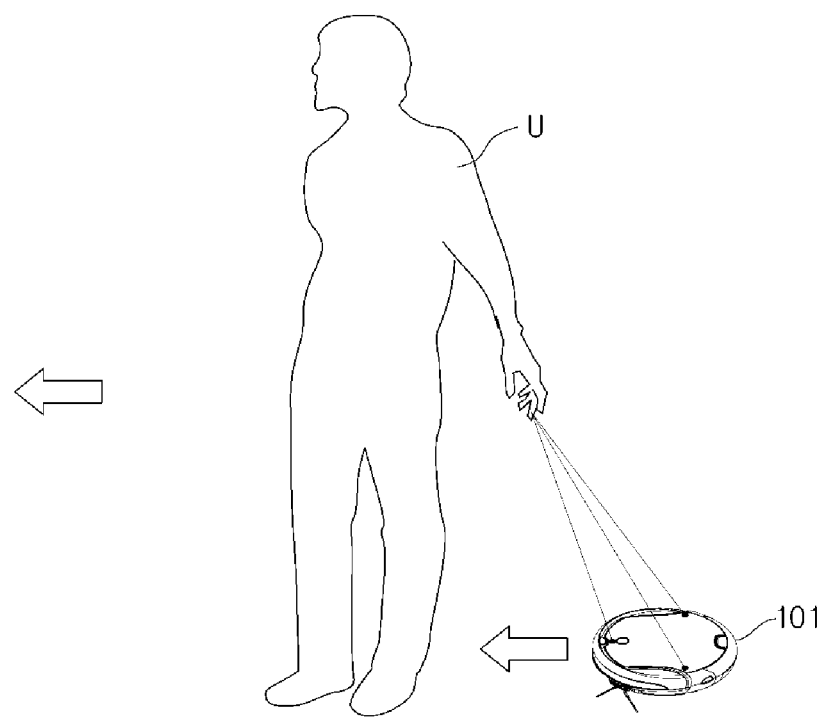

FIG. 27 is a flowchart of a method of detecting and following a physical position of a user U, the method performed by a cleaning robot, according to an exemplary embodiment. FIG. 28 is a diagram illustrating detecting and following a physical position of a user U, performed by a cleaning robot, according to an exemplary embodiment.

Referring to FIGS. 27 and 28, a cleaning robot 100 detects an object located above the main body 101 (operation S910).

In detail, the cleaning robot 100 outputs impulse signals via the first to third robot UWB communication modules 181a, 181b, and 181c and detects reflected impulse signals. As described above with reference to FIG. 4, the first, second, and third robot UWB communication modules 181a, 181b, and 181c may measure the distance to an object, based on the impulse signals reflected from the object. The position and movement of the object may be detected using the distance to the object measured by each of the first, second, and third robot UWB communication modules 181a, 181b, and 181c and using triangulation.

Next, the cleaning robot 100 determines whether an object moving above the main body 101 at a predetermined speed is present (operation S915).

For example, as illustrated in FIG. 28(a), the user U may input a 'follow' command to the cleaning robot 100 by placing his or her body (e.g., his or her arm or hand) above the cleaning robot 100 and shaking his or her body from side to side.

When an object moving at the predetermined speed is detected, the cleaning robot 100 follows the detected object (operation S920).

When the user U places his or her body (e.g., his or her arm or hand) above the cleaning robot 100 and shakes his or her body from side to side, the cleaning robot 100 recognizes the 'follow' command and selects the user U's body as an object to be followed.

When the user U is moving while placing his or her body (e.g., his or her arm or hand) above the cleaning robot 100 as illustrated in FIG. 28(b), the cleaning robot 100 may detect the position of the user U's body (e.g., the user U's arm or hand) and move to the position of the user U's body (e.g., the user U's arm or hand) according to a change in the position of the user U's body (e.g., the user U's arm or hand).

When the cleaning robot 100 detects an object while following the user U, the cleaning robot 100 may transmit information related to the obstacle to an additional portable communication device (not shown) that the user U carries with him/herself. In detail, when the movement of the cleaning robot 100 is interrupted by an obstacle, the cleaning robot 100 may transmit a 'can't follow' signal to the user U's portable communication device. The user U's portable communication device receiving the 'can't follow' signal may warn the user U of the fact that the movement of the cleaning robot 100 is interrupted by the obstacle using vibration or sound.

Also, while the cleaning robot 100 follows the user U, the cleaning robot 100 may transmit information regarding a moving speed thereof to an additional portable communication device (not shown) that the user U carries him/herself. In particular, when a moving speed of the user U is equal to or greater than a reference speed, the cleaning robot 100 may transmit the 'can't follow' signal to the user U's portable communication device, and the user U's portable communication device receiving the 'can't follow' signal may warn the user U of the fact that the moving speed of the user U exceeds the reference speed using vibration, sound, etc.

As described above, the cleaning robot 100 transmits information related to the movement of the cleaning robot 100 to the user terminal 200 while the cleaning robot 100 follows the user terminal 200, so that the user U may recognize the information related to the movement of the cleaning robot 100.

As described above, the user U may cause the cleaning robot 100 to move to a specific location in a space to be cleaned without the user terminal 200.

Detecting the position of the user terminal 200 or the position of the user U's arm, performed by the cleaning robot 100, has been described above.

Calculating the position of the cleaning robot 100, performed by the cleaning robot 100, will be described below.

Figure 29:
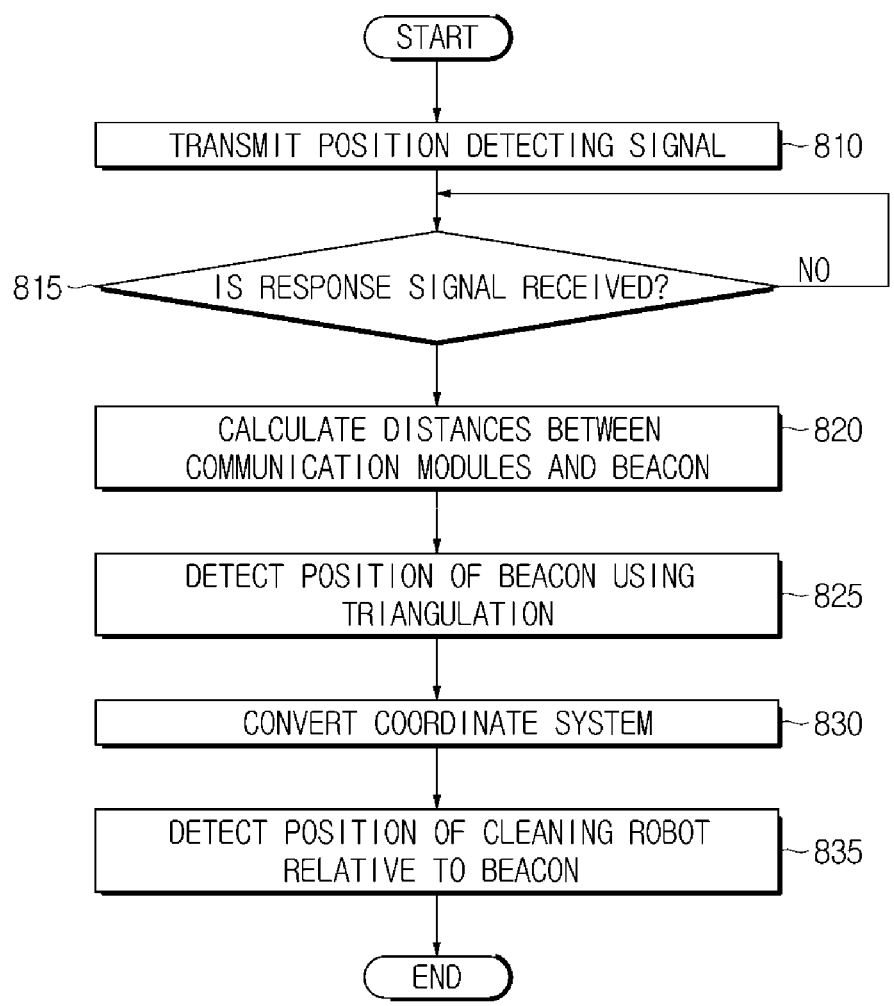
FIG. 29 is a flowchart of a method of calculating the coordinates of a cleaning robot relative to a beacon, the method performed by the cleaning robot, according to an exemplary embodiment.
Figure 30:
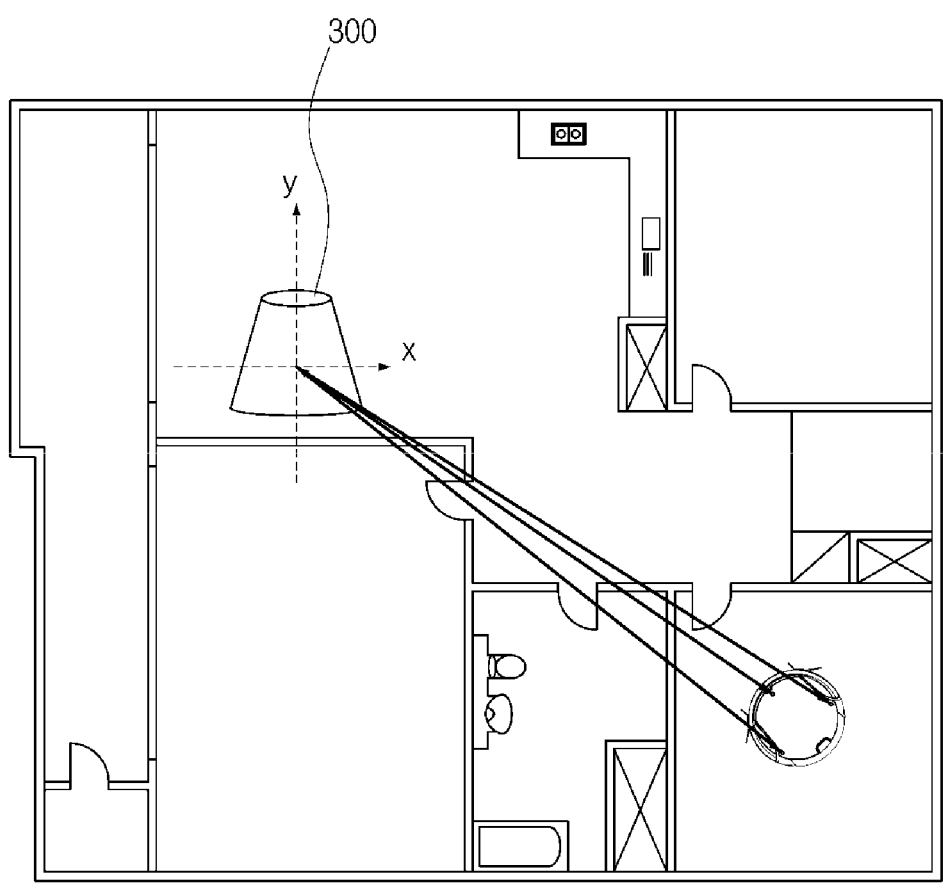
FIG. 30 is a diagram illustrating calculating the coordinates of a cleaning robot relative to a beacon, performed by the cleaning robot, according to an exemplary embodiment.

FIG. 29 is a flowchart of a method of calculating the coordinates of a cleaning robot with respect to a beacon, the method performed by the cleaning robot, according to an exemplary embodiment. FIG. 30 is a diagram illustrating calculating the coordinates of a cleaning robot with respect to a beacon, performed by the cleaning robot, according to an exemplary embodiment.

Referring to FIGS. 29 and 30, the cleaning robot 100 transmits a position detecting signal to a beacon 300 (operation S810).

In detail, the cleaning robot 100 transmits the position detecting signal to the beacon 300 via the first, second, and third robot UWB communication modules 181*a*, 181*b*, and 181*c* as illustrated in FIG. 30.

The beacon 300 will be described below. The beacon 300 is installed for the cleaning robot 100 to calculate a position of the cleaning robot 100 itself in a space to be cleaned, and may be an entry-prevention device that prevents the cleaning robot 100 from entering a charging station or a specific location. The beacon 300 may include a UWB communication module (not shown) or a beacon data communication module (not shown) to communicate with the cleaning robot 100.

Then, the cleaning robot 100 determines whether a response signal is received from the beacon 300 (operation S815).

As soon as receiving the position detecting signal, the beacon 300 transmits a response signal to the cleaning robot 100. The cleaning robot 100 determines whether the response signal is received.

When it is determined that the response signal is received (when 'Yes' in operation S815), the cleaning robot 100 calculates the distances between the robot UWB communication modules 181*a*, 181*b*, and 181*c* and the beacon 300 (operation S820).

In detail, the cleaning robot 100 may calculate the distances between the first, second, and third robot UWB communication modules 181*a*, 181*b*, and 181*c* and the beacon 300, based on a time difference between time when the position detecting signal is transmitted and time when the response signal is received.

Next, the cleaning robot 100 detects the position of the beacon 30 using triangulation (operation S825).

In detail, the cleaning robot 100 may calculate the coordinates of the beacon 300 in a coordinate system (in which the position of the cleaning robot 100 is set as an origin) using triangulation.

Then, the cleaning robot 100 converts the coordinate system into a coordinate system in which the position of the beacon 300 is set as an origin (operation S830).

Next, the cleaning robot 100 calculates the coordinates of the cleaning robot 100 in the coordinate system in which the position of the beacon 300 is set as the origin (operation S835).

The cleaning robot 100 may detect the position thereof in the space to be cleaned according to the above method.

The cleaning robot 100 may be prevented from entering an entry-prevention region by comparing the coordinates of the cleaning robot 100 relative to the beacon 300 with those of the entry-prevention region, and may easily return to a charging station (not shown) by comparing the coordinates of the cleaning robot 100 with those of the charging station.

In the present disclosure, various exemplary embodiments of the present invention have been illustrated and described. However, the present invention is not limited to the exemplary embodiments set forth herein, and may be embodied in many different forms by those of ordinary skill in the technical field to which the invention pertains without departing from the sprit and idea of the invention as defined in the claims. Such modified examples of the present invention should not be understood separately from the invention disclosed herein.

The invention claimed is:

1. A cleaning robot, comprising:
a main body;
a driving unit provided in the main body and configured to move the main body;
a communication unit provided in the main body and configured to establish wireless communication with a user terminal for the cleaning robot; and
a controller provided in the main body and configured to:
receive a designated-position cleaning command from the user terminal along with posture information of the user terminal, with a position of the user terminal as an origin of the posture information, the user terminal transmitting the designated-position cleaning command and the posture information of the user terminal to the communication unit in response to an input of a user,
determine, based on the designated-position cleaning command, a position of the user terminal relative to the main body, with the position of the main body as an origin of the position of the user terminal,
determine, based on the position of the user terminal relative to the main body and the posture information of the user terminal, a designated cleaning position relative to the main body, with the position of the main body as an origin of the designated cleaning position, and
control the driving unit to move the cleaning robot to the designated cleaning position to perform a cleaning operation.

2. The cleaning robot of claim 1, wherein the communication unit comprises at least two ultra-wide band communication modules configured to transmit an impulse signal.

3. The cleaning robot of claim 2, wherein, in order to transmit the position detecting signal to the user terminal, the controller controls the communication unit to cause each of the at least two ultra-wide band communication modules to transmit the impulse signal to the user terminal.

4. The cleaning robot of claim 3, wherein the controller detects a distance between each of the at least two ultra-wide band communication modules and the user terminal, based on a difference between time when each of the at least two ultra-wide band communication modules transmits the impulse signal and time when each of the at least two ultra-wide band communication modules receives the response signal.

5. The cleaning robot of claim 4, wherein the controller detects coordinates of the user terminal using the distance between each of the at least two ultra-wide band communication modules and the user terminal and using triangulation.

6. The cleaning robot of claim 5, wherein, when a 'follow' command is input via the user terminal, the controller controls the driving unit such that the distances between the at least two ultra-wide band communication modules and the user terminal are less than or equal to a predetermined reference distance.

7. The cleaning robot of claim 5, wherein, when a 'follow' command is input via the user terminal, the controller controls the driving unit such that the coordinates of the user terminal are in a predetermined range of coordinates.

8. The cleaning robot of claim 5, wherein, when a manual cleaning command is input via the user terminal, the controller controls the driving unit to move the main body along a moving trajectory of the user terminal.

9. The cleaning robot of claim 8, wherein, in order to detect the moving trajectory of the user terminal, the controller calculates a moving direction and displacement of the user terminal, based on a change in the coordinates of the user terminal.

10. The cleaning robot of claim 9, wherein the controller controls the driving unit to move the main body by the moving displacement in the moving direction.

11. The cleaning robot of claim 2, wherein the communication unit establishes wireless communication with a beacon located at a reference position, and the controller transmits the position detecting signal to the beacon, and detects a position of the main body relative to the reference position, based on a time difference between the position detecting signal and a response signal transmitted from the beacon.

12. The cleaning robot of claim 11, wherein the controller detects a position of the beacon relative to the main body based on the time difference, and calculates the position of the main body based on the position of the beacon.

13. The cleaning robot of claim 2, wherein the communication unit outputs a sensing radio wave and receives a radio wave reflected from a user's body, and the controller detects a position of the user's body based on a time difference between the sensing radio wave and the reflected radio wave, and controls the driving unit when a follow-user command is input, such that a distance between the user and the main body is less than or equal to a predetermined reference distance.

14. The cleaning robot of claim 1, wherein the controller is further configured to:

transmit a position detecting signal to the user terminal, and obtain the position of the user terminal based on a time difference between the position detecting signal and a response signal transmitted from the user terminal.

15. The cleaning robot of claim 1, wherein the controller is further configured to:

receive the position of the user terminal from the user terminal.

\* \* \* \* \*